United States Patent
Atallah et al.

(10) Patent No.: US 11,698,933 B1
(45) Date of Patent: Jul. 11, 2023

(54) USING DYNAMIC ENTITY SEARCH DURING ENTRY OF NATURAL LANGUAGE COMMANDS FOR VISUAL DATA ANALYSIS

(71) Applicant: Tableau Software, LLC, Seattle, WA (US)

(72) Inventors: Ryan Andrew Atallah, Palo Alto, CA (US); Yukiko Ishida Anonuevo, Concord, CA (US)

(73) Assignee: Tableau Software, LLC, Seattle, WA (US)

( * ) Notice: Subject to any disclaimer, the term of this patent is extended or adjusted under 35 U.S.C. 154(b) by 273 days.

(21) Appl. No.: 17/026,113

(22) Filed: Sep. 18, 2020

(51) Int. Cl.
*G06F 16/00* (2019.01)
*G06F 16/9032* (2019.01)
*G06F 16/9038* (2019.01)
*G06F 40/18* (2020.01)
*G06F 40/284* (2020.01)
*G06F 40/237* (2020.01)
(Continued)

(52) U.S. Cl.
CPC .... *G06F 16/90328* (2019.01); *G06F 16/3344* (2019.01); *G06F 16/904* (2019.01); *G06F 16/9038* (2019.01); *G06F 40/18* (2020.01); *G06F 40/237* (2020.01); *G06F 40/284* (2020.01)

(58) Field of Classification Search
CPC .................................................. G06F 16/3344
See application file for complete search history.

(56) References Cited

U.S. PATENT DOCUMENTS 7,019,749 B2  3/2006  Guo et al.
7,089,266 B2  8/2006  Stolte et al.
(Continued)

FOREIGN PATENT DOCUMENTS

WO  WO2018/204696 A1  11/2018

OTHER PUBLICATIONS

Allen, J. Recognizing Intentions from Natural Language Utterances. In Computational Models of Discourse, M. Brady, Ed. M.I.T. Press, Cambridge, Massachusetts, 1982, 12 Pgs.
(Continued)

*Primary Examiner* — Ajith Jacob
(74) *Attorney, Agent, or Firm* — Morgan, Lewis & Bockius LLP

(57) ABSTRACT

A computing device receives from a user a partial natural language input related to a data source. The computing device receives an additional keystroke corresponding to the partial natural language input. The partial natural language input and the additional keystroke comprise a character string. In response to the additional keystroke, the computing device generates one or more interpretations corresponding to entities in the data source. The computing device displays the interpretations. In some implementation, the character string comprises a sequence of terms, and the device displays the interpretations in a dropdown menu adjacent to the most recently entered term in the sequence. In some implementations, the dropdown menu includes a plurality of rows, each row displaying a respective data value and a respective data field corresponding to the respective data value. Some implementations display a statistical distribution of data values for a data field (displayed adjacent to the first interpretation).

19 Claims, 25 Drawing Sheets

(51) Int. Cl.
*G06F 16/904* (2019.01)
*G06F 16/33* (2019.01)

(56) References Cited

U.S. PATENT DOCUMENTS

| | | |
|---|---|---|
| 7,391,421 B2 | 6/2008 | Guo et al. |
| 7,606,714 B2 | 10/2009 | Williams et al. |
| 7,716,173 B2 | 5/2010 | Stolte et al. |
| 8,321,465 B2 | 11/2012 | Farber et al. |
| 8,489,641 B1 | 7/2013 | Seefeld et al. |
| 8,713,072 B2 | 4/2014 | Stolte et al. |
| 8,972,457 B2 | 3/2015 | Stolte et al. |
| 9,183,235 B2 | 11/2015 | Stolte et al. |
| 9,244,971 B1 | 1/2016 | Kalki |
| 9,477,752 B1 | 10/2016 | Romano |
| 9,501,585 B1 | 11/2016 | Gautam et al. |
| 9,575,720 B2 | 2/2017 | Faaborg et al. |
| 9,794,613 B2 | 10/2017 | Jang et al. |
| 9,858,292 B1 | 1/2018 | Setlur et al. |
| 9,953,645 B2 | 4/2018 | Bak et al. |
| 2004/0030741 A1 | 2/2004 | Wolton et al. |
| 2004/0039564 A1 | 2/2004 | Mueller |
| 2004/0073565 A1 | 4/2004 | Kaufman et al. |
| 2004/0114258 A1 | 6/2004 | Harris et al. |
| 2005/0015364 A1 | 1/2005 | Gupta et al. |
| 2006/0021840 A1 | 2/2006 | Kimes et al. |
| 2006/0218140 A1 | 9/2006 | Whitney et al. |
| 2006/0259394 A1 | 11/2006 | Cushing et al. |
| 2006/0259775 A2 | 11/2006 | Oliphant |
| 2007/0174350 A1 | 7/2007 | Pell et al. |
| 2007/0179939 A1 | 8/2007 | O'Neil et al. |
| 2008/0046462 A1 | 2/2008 | Kaufman et al. |
| 2009/0171924 A1 | 7/2009 | Nash et al. |
| 2009/0299990 A1 | 12/2009 | Setlur et al. |
| 2009/0313576 A1 | 12/2009 | Neumann et al. |
| 2010/0030552 A1 | 2/2010 | Chen et al. |
| 2010/0110076 A1 | 5/2010 | Hao et al. |
| 2010/0313164 A1 | 12/2010 | Louch et al. |
| 2011/0066972 A1 | 3/2011 | Sugiura |
| 2011/0191303 A1 | 8/2011 | Kaufman et al. |
| 2012/0047134 A1 | 2/2012 | Hansson et al. |
| 2012/0179713 A1 | 7/2012 | Stolte et al. |
| 2013/0031126 A1 | 1/2013 | Setlur |
| 2013/0055097 A1 | 2/2013 | Soroca et al. |
| 2014/0189548 A1 | 7/2014 | Werner |
| 2014/0192140 A1 | 7/2014 | Peevers et al. |
| 2015/0019216 A1 | 1/2015 | Singh et al. |
| 2015/0026153 A1 | 1/2015 | Gupta et al. |
| 2015/0026609 A1 | 1/2015 | Kim |
| 2015/0058318 A1 | 2/2015 | Blackwell et al. |
| 2015/0095365 A1 | 4/2015 | Olenick et al. |
| 2015/0123999 A1 | 5/2015 | Ofstad et al. |
| 2015/0269175 A1 | 9/2015 | Espenshade et al. |
| 2015/0310855 A1 | 10/2015 | Bak et al. |
| 2015/0379989 A1 | 12/2015 | Balasubramanian et al. |
| 2016/0070451 A1 | 3/2016 | Kim et al. |
| 2016/0103886 A1 | 4/2016 | Prophete et al. |
| 2016/0188539 A1 | 6/2016 | Parker et al. |
| 2016/0261675 A1 | 9/2016 | Block et al. |
| 2016/0283588 A1 | 9/2016 | Katae |
| 2016/0335180 A1 | 11/2016 | Teodorescu et al. |
| 2016/0378725 A1 | 12/2016 | Marchsreiter |
| 2017/0083615 A1 | 3/2017 | Boguraev et al. |
| 2017/0285931 A1 | 10/2017 | Duhon et al. |
| 2017/0357625 A1 | 12/2017 | Carpenter et al. |
| 2018/0108359 A9 | 4/2018 | Gunn et al. |
| 2018/0114190 A1 | 4/2018 | Borrel et al. |
| 2018/0121618 A1 | 5/2018 | Smith et al. |
| 2018/0181608 A1 | 6/2018 | Wu et al. |
| 2019/0034429 A1 | 1/2019 | Das et al. |
| 2019/0065456 A1 | 2/2019 | Platow |
| 2019/0205442 A1 | 7/2019 | Vasudev et al. |
| 2019/0272296 A1* | 9/2019 | Prakash ............ G06F 16/90335 |
| 2019/0362009 A1 | 11/2019 | Miseldine et al. |
| 2020/0012638 A1 | 1/2020 | Lou et al. |
| 2020/0065769 A1 | 2/2020 | Gupta et al. |
| 2020/0089700 A1 | 3/2020 | Ericson et al. |
| 2020/0089760 A1 | 3/2020 | Ericson et al. |
| 2020/0097494 A1 | 3/2020 | Vertsel et al. |
| 2020/0274841 A1 | 8/2020 | Lee et al. |
| 2020/0293167 A1 | 9/2020 | Blyumen |
| 2020/0301916 A1* | 9/2020 | Nguyen ............ G06F 16/3344 |
| 2021/0042308 A1 | 2/2021 | Mustafi |
| 2021/0279805 A1 | 9/2021 | Elkan et al. |

OTHER PUBLICATIONS

Androutsopoulos, I., Ritchie, G. D., and Thanisch, P. Natural language interfaces to databases—an introduction. Natural Language Engineering 1, Mar. 16, 1995, 50 pgs.

Arnold et al., On Suggesting Phrases vs. Predicting Words for Mobile Text Composition, UIST, 2016, pp. 603-608 (Year: 2016).

Atallah, Office Action, U.S. Appl. No. 17/063,663, dated Feb. 26, 2021, 19 pgs.

Atallah, Final Office Action, U.S. Appl. No. 17/063,663, dated Jul. 19, 2021, 20 pgs.

Atallah, Notice of Allowance, U.S. Appl. No. 17/063,663, dated Dec. 22, 2021, 11 pgs.

Aurisano, J., Kumar, A., Gonzales, A., Reda, K., Leigh, J., Di Eugenio, B., and Johnson, A. Show me data? observational study of a conversational interface in visual data exploration. In Poster at IEEE VIS 2015, IEEE (2015), 2 pgs.

Bostock, M., Ogievetsky, V., and Heer, J. D3: Data-driven documents. IEEE Transactions on Visualization & Computer Graphics (Proc. InfoVis), Oct. 23, 2011, 9 pgs.

Carbonell, J. G., Boggs, W. M., Mauldin, M. L., and Anick, P. G. The xcalibur project, a natural language interface to expert systems and data bases, 1985, 5 pgs.

Cover, T. M., and Thomas, J. A. Elements of Information Theory. Wiley-Interscience, New York, NY, USA, 1991, 36 pgs.

Cox, K., Grinter, R. E., Hibino, S. L., Jagadeesan, L. J., and Mantilla, D. A multi-modal natural language interface to an information visualization environment. International Journal of Speech Technology 4, 3 (2001), 18 pgs.

Egenhofer, M. Spatial sql: A query and presentation language. IEEE Transactions on Knowledge and Data Engineering 6, 1 (1994), 12 pgs.

Ericson, Office Action, U.S. Appl. No. 16/680,431, dated Jan. 8, 2021, 18 pgs.

Ericson, Office Action, U.S. Appl. No. 16/680,431, dated May 19, 2021, 22 pgs.

Ericson, Office Action, U.S. Appl. No. 16/680,431, dated Nov. 10, 2021, 22 pgs.

Ericson, Office Action, U.S. Appl. No. 16/134,907, dated May 13, 2020, 9 pgs.

Ericson, Office Action, U.S. Appl. No. 16/134,907, dated Nov. 12, 2020, 10 pgs.

Ericson, Office Action, U.S. Appl. No. 16/134,892, dated May 15, 2020, 10 pgs.

Ericson, Final Office Action, U.S. Appl. No. 16/134,892, dated Nov. 24, 2020, 11 pgs.

Ericson, Notice of Allowance, U.S. Appl. No. 16/134,892, dated Mar. 9, 2021, 11 pgs.

Ericson, Office Action, U.S. Appl. No. 16/601,437, dated Jun. 24, 2021, 15 pgs.

Ericson, Final Office Action, U.S. Appl. No. 16/601,437, dated Nov. 12, 2021, 17 pgs.

Ericson, Notice of Allowance, U.S. Appl. No. 16/601,437, dated May 2, 2022, 10 pgs.

Finin, T., Joshi, A. K., and Webber, B. Natural language interactions with artificial experts. Proceedings of the IEEE 74, 7 (Jun. 1986), 19 pgs.

Frank, A. U., and Mark, D. M. Language issues for Geographical information systems. In Geographical Information Systems: Principles and Applications, vol. 1, D. Maguire, M. Goodchild, and D. Rhind, Eds. Longman, London, 1991, 26 pgs.

Gao, T., Dontcheva, M., Adar, E., Liu, Z., and Karahalios, K. G. Datatone: Managing ambiguity in natural language interfaces for

(56) References Cited

OTHER PUBLICATIONS data visualization. In Proceedings of the 28th Annual ACM Symposium on User Interface Software Technology, UIST '15, ACM (New York, NY, USA, 2015), 12 pgs.
Grammel, L., Tory, M., and Storey, M. A. How information visualization novices construct visualizations. IEEE Transactions on Visualization and Computer Graphics 16, 6 (Nov. 2010), 10 pgs.
Goldner, Office Action, U.S. Appl. No. 16/681,754, dated Mar. 2, 2022, 11 pgs.
Hoque, Enamul et al., "Applying Pragmatics Principles for Interaction with Visual Analytics," TFEE Transaction of Visualization and Computer Graphics, IEEE Service Center, Los Alamitos, CA, vol. 24, No. 1, Jan. 1, 2018, 10 pgs.
IBM Watson Analytics. http://www.ibm.com/analytics/watson-analytics/, downloaded on May 9, 2017, 6 pgs.
Kumar et al., "Towards a Dialogue System that Supports Rich Visualizations of Data," Proceeding of the Sigdual 2016 Conference, LA, USA, ACL, Sep. 13, 2016, pp. 304-209, Xp055496498.
Lawson, I-want-to-go moments: From search to store. https://www.thinkwithgoogle.com/articles/i-want-to-go-micro-moments.html, Apr. 2015, 7 pgs.
Li, F., and Jagadish, H. V. Constructing an interactive natural language interface for relational databases. Proc. VLDB Endow. 8, 1 (Sep. 2014), 12 pgs.
Microsoft Q & A. https://powerbi.microsoft.com/en-us/documentation/powerbi-service-q-and-a/, Mar. 14, 2017, 5 pgs.
Montello, D., Goodchild, M., Gottsegen, J., and Fohl, P. Where's downtown? behavioral methods for determining referents for vague spatial queries. Spatial Cognition and Computation 3, 2&3 (2003), 20 pgs.
NarrativeScience, Turn your data into better decisions with Quill, https://www.narrativescience.com/quill, downloaded on May 9, 2017, 12 pgs.
Ng, H. T., and Zelle, J. Corpus-based approaches to semantic interpretation in natural language processing, AI Magazine Winter 1997, (1997), 20 pgs.
Node.js®. https://nodejs.org/, downloaded on May 10, 2017, 1 pg.
Oviatt, S., and Cohen, P. Perceptual user interfaces: Multimodal interfaces that process what comes naturally. Commun, ACM 43, 3 (Mar. 2000), 9 pgs.
Parr, T. The Definitive ANTLR 4 Reference, 2nd ed.Pragmatic Bookshelf, 2013, 322 Pgs.
Pedersen, T., Patwardhan, S., and Michelizzi, J. Wordnet::similarity: Measuring the relatedness of concepts. In Demonstration Papers at HLT-NAACL 2004, HLT-NAACL—Demonstrations '04, Association for Computational Linguistics (Stroudsburg, PA, USA, 2004), 2 pgs.
Popescu, A.-M., Etzioni, O., and Kautz, H. Towards a theory of natural language interfaces to databases. In Proceedings of the 8th International Conference on Intelligent User Interfaces, IUI '03, ACM (New York, NY, USA, 2003), 9 pgs.
Pustejovsky, J., Castaño, J., Ingria, R., Saurí, R., Gaizauskas, R., Setzer, A., and Katz, G. Timeml: Robust specification of went and temporal expressions in text. In Fifth International Workshop on Computational Semantics (IWCS-5 (2003), 7 pgs.
Reinhart, T. Pragmatics and Linguistics: An Analysis of Sentence Topics. IU Linguistics Club publications. Reproduced by the Indiana University Linguistics Club, 1982, 5 pgs.
Setlur, Pre-Interview First Office Action dated Jul. 5, 2018, received in U.S. Appl. No. 15/486,265, 5 pgs.
Setlur, First Action Interview Office Action dated Aug. 29, 2018, received in U.S. Appl. No. 15/486,265, 6 pgs.
Setlur, Final Office Action dated Apr. 25, 2019, received in U.S. Appl. No. 15/486,265, 15 pgs.
Setlur, Notice of Allowance dated Sep. 6, 2019, received in U.S. Appl. No. 15/486,265, 13 pgs.
Setlur, Pre-Interview First Office Action dated Sep. 6, 2019, received in U.S. Appl. No. 15/804,991, 4 pgs.
Setlur, First Action Interview Office Action dated Oct. 29, 2019, received in U.S. Appl. No. 15/804,991, 6 pgs.
Setlur, Final Office Action, U.S. Appl. No. 15/804,991, dated Mar. 4, 2020, 14 pgs.
Setlur, Notice of Allowance, U.S. Appl. No. 15/804,991, dated Jul. 1, 2020, 15 pgs.
Setlur, Preinterview 1st Office Action, U.S. Appl. No. 15/978,062, dated Mar. 6, 2020, 4 pgs.
Setlur, Notice of Allowance, U.S. Appl. No. 15/978,062, dated May 29, 2020, 19 pgs.
Setlur, Office Action, U.S. Appl. No. 15/978,066, dated Mar. 18, 2020, 23 pgs.
Setlur, Final Office Action, U.S. Appl. No. 15/978,066, dated Aug. 19, 2020, 22 pgs.
Setlur, Office Action, U.S. Appl. No. 15/978,067, dated Feb. 21, 2020, 20 pgs.
Setlur, Final Office Action, U.S. Appl. No. 15/978,067, dated Aug. 5, 2020, 19 pgs.
Setlur et al., Eviza: A Natural Language Interface for Visual Analysis, ACM Oct. 16, 2016, 13 pgs.
Sun, Y., L. J. J. A., and Di Eugenio, B. Articulate: Creating meaningful visualizations from natural language. In Innovative Approaches of Data Visualization and Visual Analytics, IGI Global, Hershey, PA (2014), 20 pgs.
Tableau, Communication Pursuant to Rules 161(1) and 162, EP18729514.2, dated Jun. 17, 2019, 3 pgs.
Tableau, Extended European Search Report, EP18729514.2, dated Mar. 4, 2020, 4 pgs.
Tableau Software, Inc., International Searh Report and Written Opinion, PCT/US2018/030959, dated Sep. 14, 2018, 13 pgs.
Tableau Software, Inc., International Preliminary Report on Patentability, PCT/US2018/030959, dated Nov. 5, 2019, 11 pgs.
Tableau Software Inc., International Search Report and Written Opinion, PCT/US2019/047892, dated Mar. 4, 2020, 24 pgs.
ThoughtSpot. Search-Driven Analytics for Humans, http://www.thoughtspot.com/, downloaded May 9, 2017, 9 pgs.
Turf: Advanced geospatial analysis for browsers and node, http://turfjs.org, downloaded May 9, 2017, 2 pgs.
Wikipedia, Extended Backus-Naur Form, https://en.wikipedia.org/wiki/Extended_Backus%E2%80%93Naur_Form, last edited on Jan. 7, 2017, 7 pgs.
Winograd, T. Procedures as a Representation for Data in a Computer Program for Understanding Natural Language. PhD thesis, Feb. 1971, 472 pgs.
WolframAlpha. Profesional-grade computational, https://www.wolframalpha.com/, downloaded May 9, 2017, 25 pgs.
Wu, Z., and Palmer, M. Verbs semantics and lexical selection. In Proceedings of the 32nd Annual Meeting on Association for Computational Linguistics, ACL '94, Association for Computational Linguistics (Stroudsburg, PA, USA, 1994), 6 pgs.

\* cited by examiner

Analytical Expressions 238
- Aggregation Expressions 240
- Group Expressions 242
- Filter Expressions 244
- Limit Expressions 246
- Sort Expressions 248
- ⋮

Figure 2B

Grammar Lexicon 262
- Analytical Concepts 266
  - Fields 268
  - Values 270
  - Aggregation 272
  - Group 274
  - Filter 276
  - Limit 278
  - Sort 280
  - ⋮
- ⋮

Figure 2C

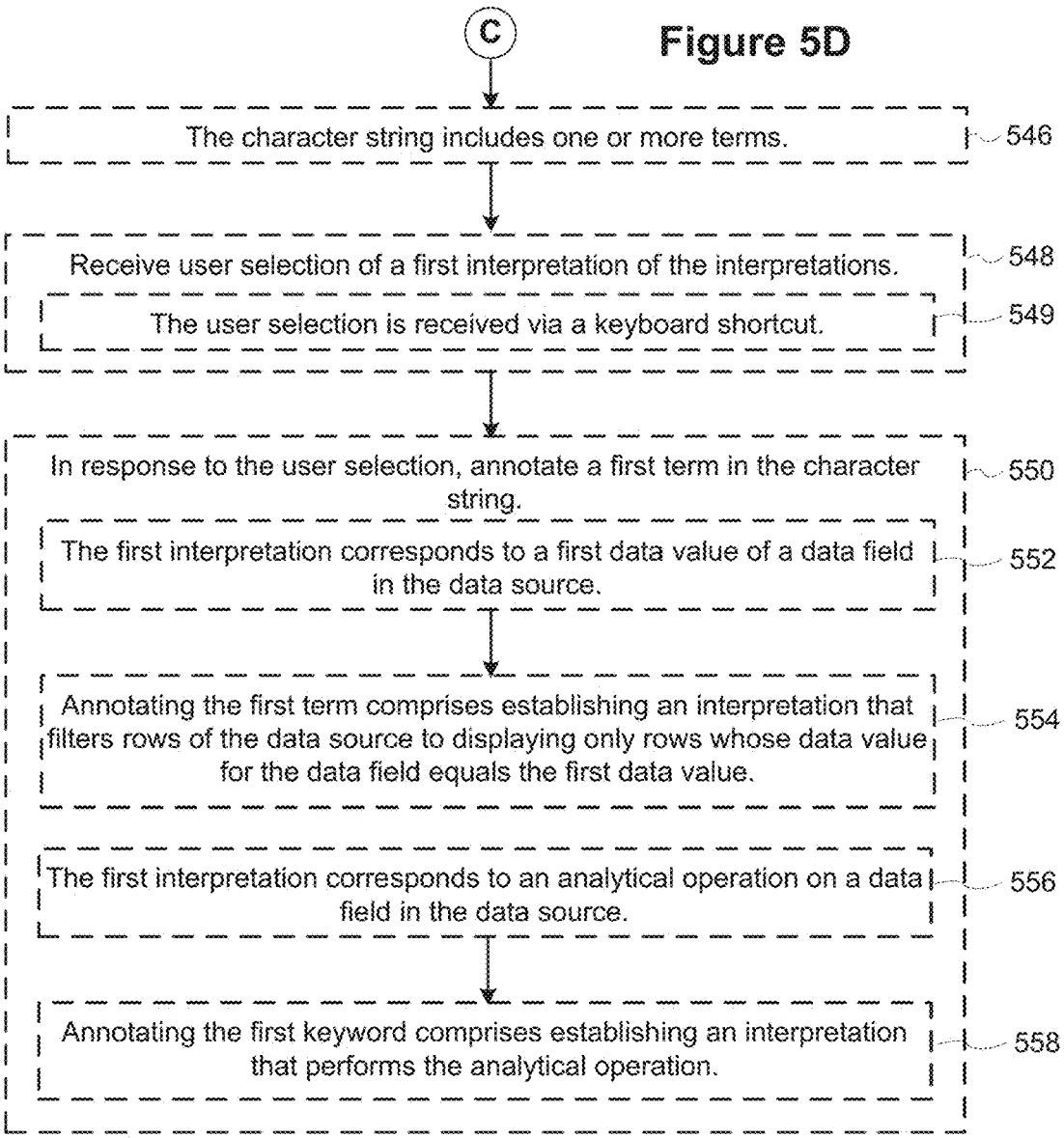

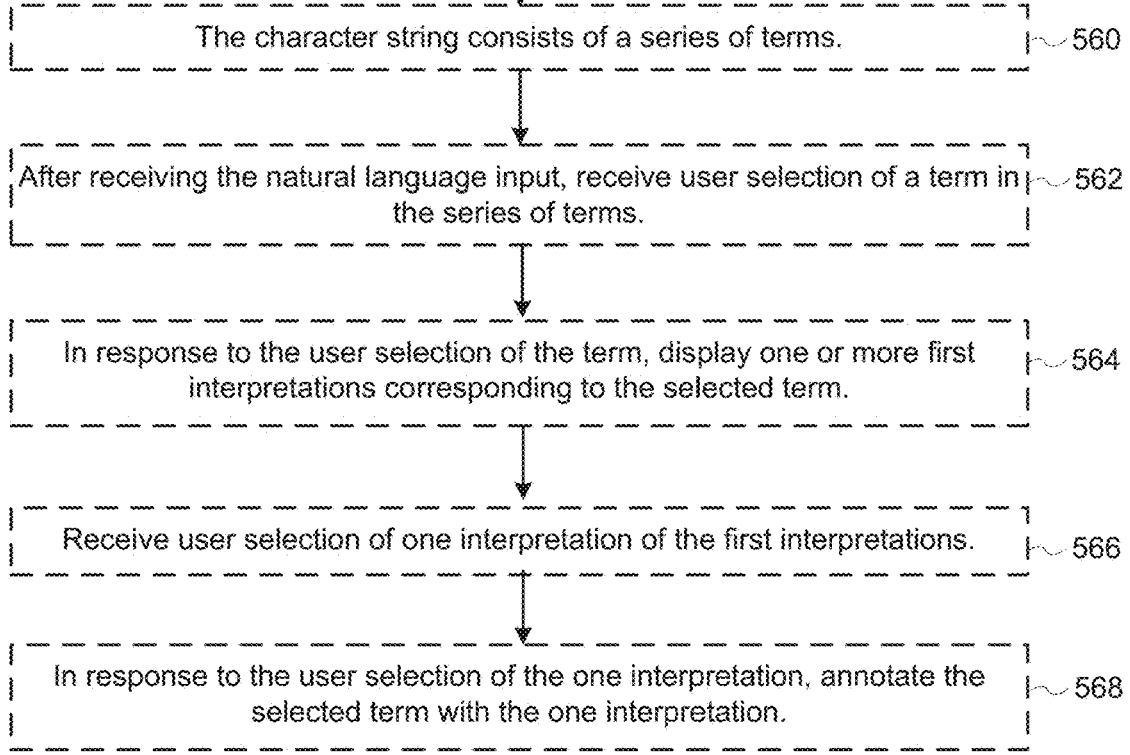
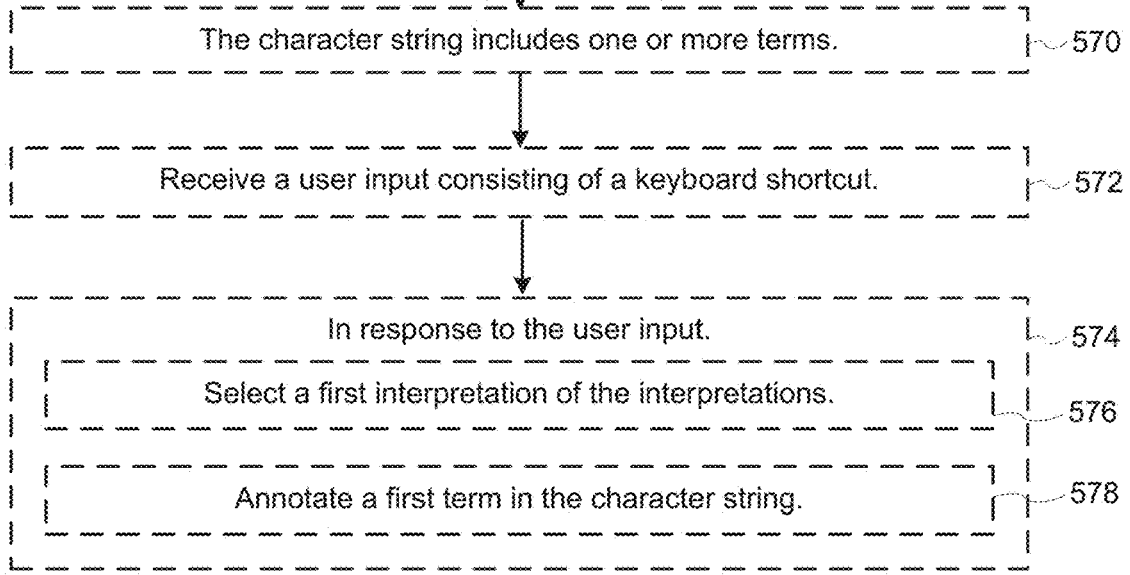

USING DYNAMIC ENTITY SEARCH DURING ENTRY OF NATURAL LANGUAGE COMMANDS FOR VISUAL DATA ANALYSIS

RELATED APPLICATIONS

This application is related to the following applications, each of which is incorporated by reference herein in its entirety:
(i) U.S. patent application Ser. No. 15/486,265, filed Apr. 12, 2017, entitled "Systems and Methods of Using Natural Language Processing for Visual Analysis of a Data Set," now U.S. Pat. No. 10,515,121;
(ii) U.S. patent application Ser. No. 15/804,991, filed Nov. 6, 2017, entitled "Systems and Methods of Using Natural Language Processing for Visual Analysis of a Data Set";
(iii) U.S. patent application Ser. No. 15/978,062, filed May 11, 2018, entitled "Applying Natural Language Pragmatics in a Data Visualization User Interface";
(iv) U.S. patent application Ser. No. 15/978,066, filed May 11, 2018, entitled "Data Visualization User Interface Using Cohesion of Sequential Natural Language Commands";
(v) U.S. patent application Ser. No. 15/978,067, filed May 11, 2018, entitled "Updating Displayed Data Visualizations According to Identified Conversation Centers in Natural Language Commands";
(vi) U.S. patent application Ser. No. 16/219,406, filed Dec. 13, 2018, entitled "Identifying Intent in Visual Analytical Conversations";
(vii) U.S. patent application Ser. No. 16/134,892, filed Sep. 18, 2018, entitled "Analyzing Natural Language Expressions in a Data Visualization User Interface";
(viii) U.S. patent application Ser. No. 16/134,907, filed Sep. 18, 2018, entitled "Natural Language Interface for Building Data Visualizations, Including Cascading Edits to Filter Expressions";
(ix) U.S. patent application Ser. No. 16/166,125, filed Oct. 21, 2018, entitled "Determining Levels of Detail for Data Visualizations Using Natural Language Constructs";
(x) U.S. patent application Ser. No. 16/234,470, filed Dec. 27, 2018, entitled "Analyzing Underspecified Natural Language Utterances in a Data Visualization User Interface";
(xi) U.S. patent application Ser. No. 16/601,437, filed Oct. 14, 2019, entitled "Incremental Updates to Natural Language Expressions in a Data Visualization User Interface";
(xii) U.S. patent application Ser. No. 16/680,431, filed Nov. 11, 2019, entitled "Using Refinement Widgets for Data Fields Referenced by Natural Language Expressions in a Data Visualization User Interface";
(xiii) U.S. patent application Ser. No. 14/801,750, filed Jul. 16, 2015, entitled "Systems and Methods for using Multiple Aggregation Levels in a Single Data Visualization"; and
(xiv) U.S. patent application Ser. No. 16/681,754, filed Nov. 12, 2019, entitled "Using Natural Language Expressions to Define Data Visualization Calculations that Span Across Multiple Rows of Data from a Database."

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

SUMMARY

The use of natural language expressions to generate data visualizations provides a user with greater accessibility to data visualization features, including updating the fields and changing how the data is filtered. A natural language interface enables a user to develop valuable data visualizations with little or no training.

There is a need for improved systems and methods that support and refine natural language interactions with visual analytical systems. The present disclosure describes data visualization platforms that improve the effectiveness of natural language interfaces by resolving natural language utterances as they are being input by a user of the data visualization platform. Unlike existing interfaces that require natural language inputs to be composed of complete words and/or phrases, the present disclosure describes a natural language interface that provides feedback (e.g., generates interpretations, search results, or entity search results) in response to each subsequent additional keystroke that is input by the user.

The disclosed natural language interface also resolves ambiguities in natural language utterances by allowing a user to annotate a term in a natural language command. Annotation instructs the data visualization platform to interpret the term as a particular entity in the data source. Accordingly, by giving the user control over how a term should be disambiguated, the disclosed data visualization platforms enables more accurate visualizations to be generated. Accordingly, such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method is performed at a computing device. The computing device has a display, one or more processors, and memory. The memory stores one or more programs configured for execution by the one or more processors. The computing device receives from a user a partial natural language input related to a data source. The computing device receives an additional keystroke corresponding to the partial natural language input. The partial natural language input and the additional keystroke comprise a character string. In response to the additional keystroke, the computing device generates one or more interpretations corresponding to one or more entities in the data source. The computing device displays the interpretations.

In some implementations, the character string includes letters of a word. Each of the interpretations includes the letters.

In some implementations, the character string includes one or more terms. Each of the interpretations is an interpretation corresponding to a most recently input term in the character string.

In some implementations generating one or more interpretations comprises generating one or more tokens from the character string, and interpreting the one or more tokens according to a lexicon for the data source.

In some implementations, after generating the one or more interpretations, the computing device continues to respond to each additional subsequent keystroke by updating the interpretations according to the additional subsequent keystroke. The computing device also displays the updated interpretations.

In some implementations, the character string comprises a sequence of terms. Displaying the interpretations comprises displaying the interpretations in a dropdown menu adjacent to a most recently entered term in the sequence of terms.

In some instances, the dropdown menu comprises a plurality of rows. Each of the rows corresponds to a distinct data value of a data field in the data source. The method further comprises displaying, in each of the rows, a respective data value and a respective data field corresponding to the respective data value.

In some implementations, displaying the interpretations further comprises displaying, adjacent to a first interpretation of the interpretations, a statistical distribution of data values for a data field specified in the first interpretation.

In some implementations, the one or more entities comprise one or more of: a data field of the data source, a data value of a data field in the data source, an analytical operation on the data source, and a data visualization type.

In some instances, the analytical operation is one of: a grouping, a sort, a filter, a calculation, a count, or an aggregation operation.

In some implementations, the character string includes one or more terms. The computing device further receives user selection of a first interpretation of the interpretations. In response to the user selection, the computing device annotates a first term in the character string.

In some instances, the first interpretation corresponds to a first data value of a data field in the data source. Annotating the first term comprises establishing an interpretation that filters rows of the data source to display only rows whose data value of the data field equals the first data value.

In some instances, the first interpretation corresponds to an analytical operation on a data field in the data source. Annotating the first keyword comprises establishing an interpretation that performs the analytical operation.

In some implementations, the character string consists of a series of terms. After receiving the natural language input, the computing device receives user selection of a term in the series of terms. In response to the user selection of the term, the computing device displays one or more first interpretations corresponding to the selected term. The computing device receives user selection of one interpretation of the first interpretations. In response to the user selection of the one interpretation, the computing device annotates the selected term with the one interpretation.

In some implementations, the character string includes one or more terms. The computing device 200 receives a user input consisting of a keyboard shortcut. In response to the user input, the computing device 200 selects a first interpretation of the interpretations. The computing device also annotates a first term in the character string.

In some implementations, a computing device includes one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 2A-2D are block diagrams of a computing device according to some implementations.

FIGS. 5A-5F provide a flowchart of a method performed at a computing device according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization methods by generating and displaying interpretations in response to each subsequent additional keystroke of a partial natural language command (e.g., a command that contains incomplete words, phrases, and/or sentences), and by allowing a user to annotate a term in the natural language command, which in turn instructs a data visualization application to interpret the term as a particular entity in the data source. Such methods and devices improve user interaction with the natural language interface by providing quicker and easier incremental updates to natural language expressions related to a data visualization.

Figure 1:
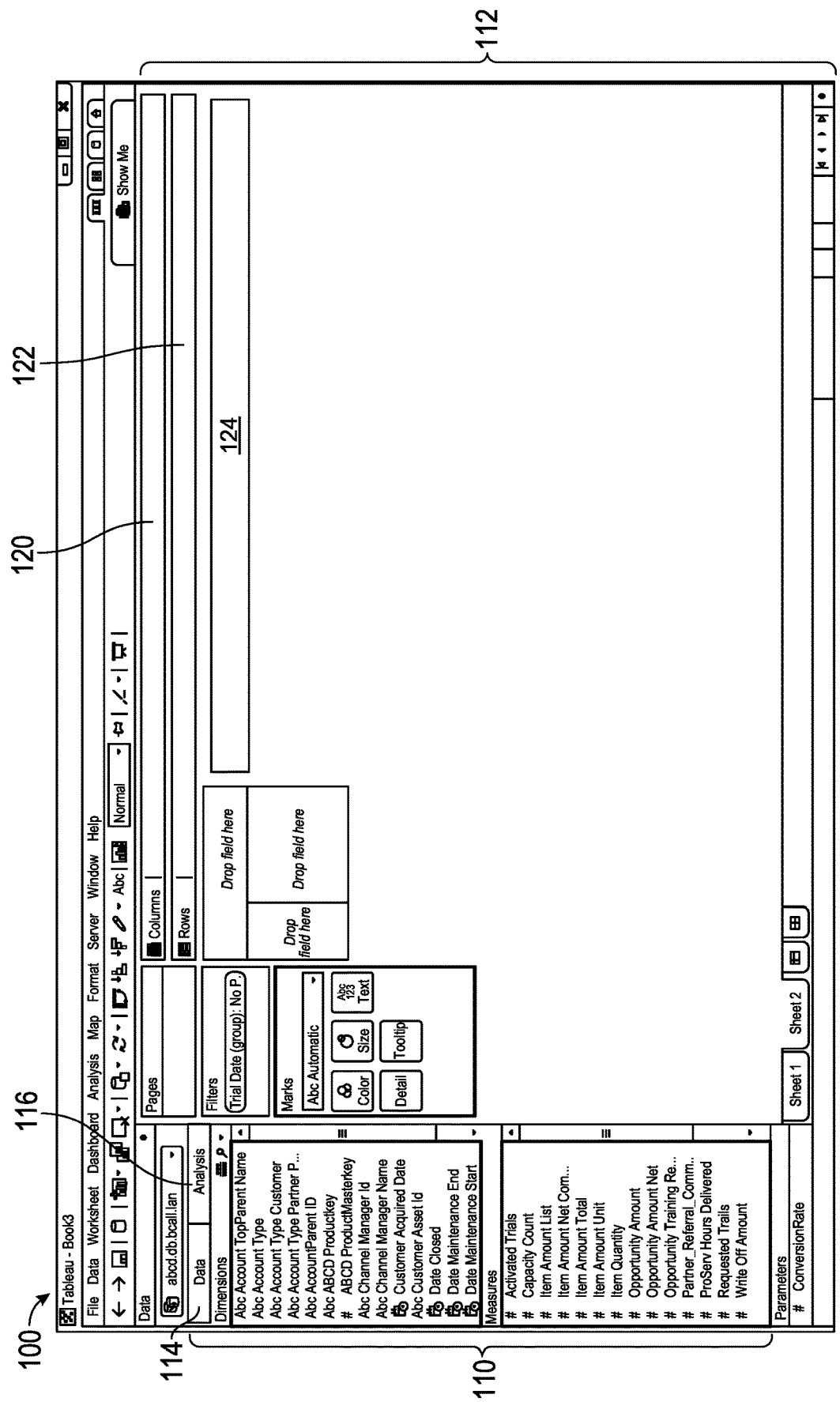
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2A:
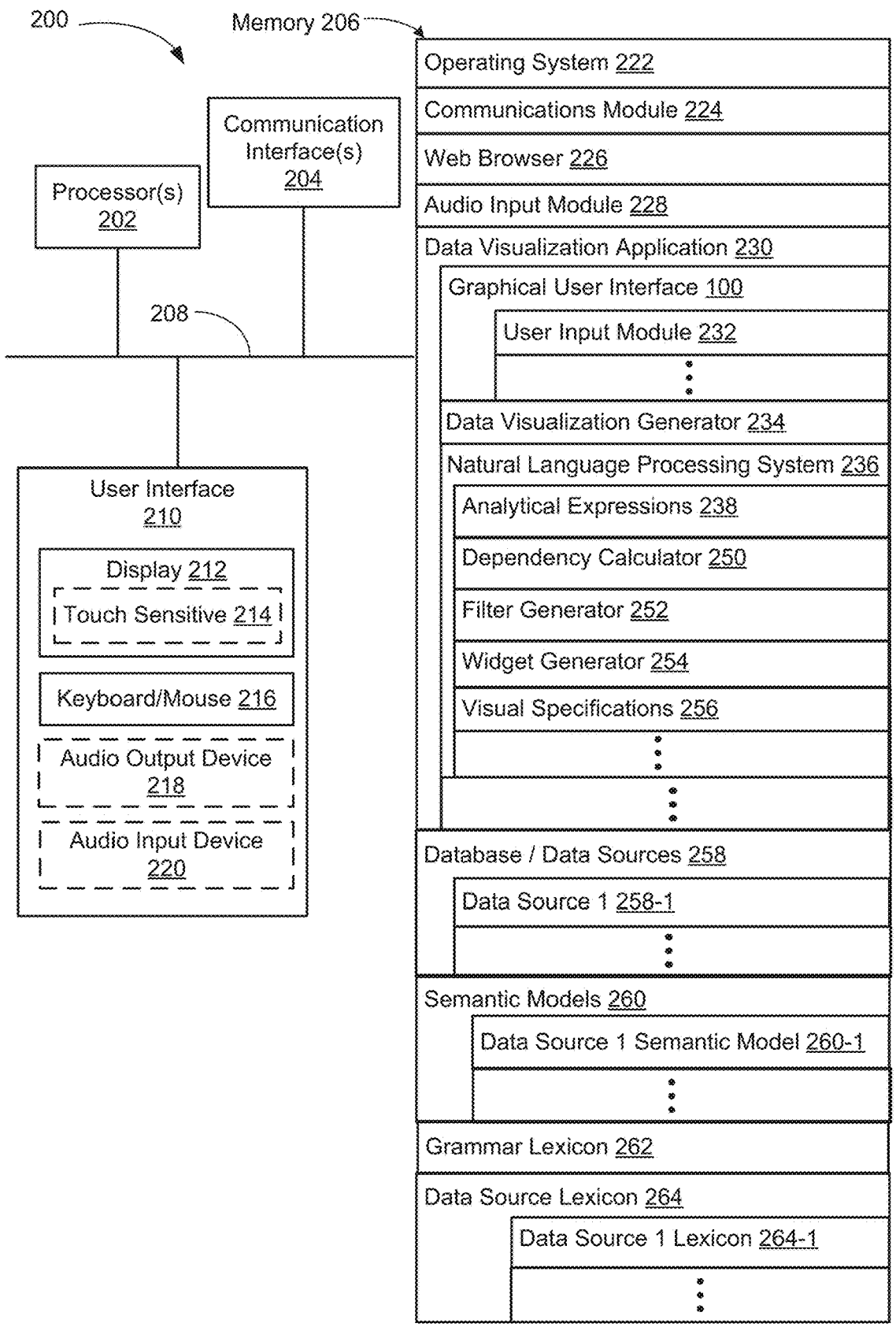

FIG. 2A is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language system 236);
- a data visualization application 230, which generates data visualizations and related features. In some implementations, the data visualization application 230 includes:
  - a graphical user interface 100 for a user to construct visual graphics. In some implementations, the graphical user interface includes a user input module 232 for receiving user input through the natural language box 124. For example, a user inputs a natural language command or expression into the natural language box 124 identifying one or more data sources 258 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;

a data visualization generator 234, which automatically generates and displays a corresponding visual graphic (also referred to as a "data visualization" or a "data viz") using the user input (e.g., the natural language input);

a natural language system 236, which receives and parses the natural language input provided by the user. The natural language system 236 may identify analytical expressions 238, which are described in FIG. 2B.

the natural language system 236 may also include a dependency calculator 250, which looks up dependencies in a database 258 to determine how particular terms and/or phrases are related (e.g., dependent);

in some implementations, the natural language system 236 includes a filter generator 252, which determines if one or more filters are related to a field that has been modified by a user. The filter generator 252 generates the one or more filters based on user selections;

a widget generator 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field; and visual specifications 256, which are used to define characteristics of a desired data visualization. In some implementations, the information the user provides (e.g., user input) is stored as a visual specification. In some implementations, the visual specifications 256 include previous natural language commands received from a user or properties specified by the user through natural language commands. In some instances, a visual specification 256 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and zero or more databases or data sources 258 (e.g., a first data source 258-1), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data source(s), and uses the selected fields to define a visual graphic.

zero or more semantic models 260 (e.g., a first semantic model 260-1), each of which is derived directly from a respective database or data source 258. The semantic model 260 represents the database schema and contains metadata about attributes. In some implementations, the semantic model 260 also includes metadata of alternative labels or synonyms of the attributes. The semantic model 260 includes data types (e.g., "text," "date," "geospatial," "Boolean," and "numeric"), attributes, (e.g., a currency type such as the United States Dollar), and a semantic role (e.g., the "City" role for a geospatial attribute) for data fields of the respective database or data source 258. In some implementations, the semantic model 260 also captures statistical values (e.g., data distribution, range limits, average, and cardinality) for each attribute. In some implementations, the semantic model 260 is augmented with a grammar lexicon 262, which contains a set of analytical concepts 266 found in many query languages (e.g., average, filter, and sort). In some implementations, the semantic model 260 also distinguishes between attributes that are measures (e.g., attributes that can be measured, aggregated, or used for mathematical operations) and dimensions (e.g., fields that cannot be aggregated except by counting). Thus, the semantic model 260 helps with inferencing and choosing salient attributes and values;

a grammar lexicon 262, which includes analytical concepts 266 (see FIG. 2C) that are used to support the analytical expressions 238 for forming intermediate expressions; and zero or more data source lexicons 264 (e.g., a first data source lexicon 264-1), each of which is associated with a respective database or data source 258. Details of the components of a data source lexicon are described in FIG. 2D.

In some implementations the computing device 200 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, canonical representations are assigned to the analytical expressions 238 (e.g., by the natural language system 236) to address the problem of proliferation of ambiguous syntactic parses inherent to natural language querying. The canonical structures are unambiguous from the point of view of the parser and the natural language system 236 is able to choose quickly between multiple syntactic parses to form intermediate expressions. Further information about the canonical representations can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

FIG. 2B is block diagram illustrating the analytical expressions 238 of the natural language system 236, in accordance with some implementations. The analytical expressions 238 include:

- aggregation expressions 240. For example, "average Sales" is an aggregate expression that includes an aggregate term "average" and an attribute "Sales." In some implementations, the aggregation expressions 240 are in the canonical form [agg att], where agg∈Aggregations and att is an Attribute;
- group expressions 242. For example, "by Region" is a group expression that includes a group term "by" and an attribute "Region." In some implementations, the group expressions 242 are in the canonical form [grp att], where grp∈Groups and att is an attribute;
- filter expressions 244. For example, "Customer Name starts with John" is a filter expression that contains an attribute "Customer Name," a filter "starts with," and a value "John." In some implementations, the filter expressions 244 are in the canonical form [att filter val], where att is an attribute, filter∈Filters, and val∈Values;
- limit expressions 246. For example, "top 5 Wineries by sum of Sales" is a limit expression that contains a limit term "top", a value "5", a group by attribute "Wineries," and an aggregation expression "sum of Sales." In some implementations, the limit expressions 246 are in the canonical form [limit val ge ae], where limit∈Limits, val∈Values, ge∈group expressions, and ae∈aggregation expressions; and
- sort expressions 248. For example, in "sort Products in ascending order by sum of Profit," the phrase "ascending order" is the sort term, "Products" is the attribute to group by, and "sum of Profit" is the aggregation expression. In some implementations, the sort expressions 248 are in the canonical form [sort ge ae], where sort∈Sorts, ge∈group expressions, and ae∈aggregation expressions.

FIG. 2C is a block diagram illustrating components of a grammar lexicon 262 according to some implementations. In some implementations, the grammar lexicon comprises analytical concepts 266 that support the formation of analytical expressions 238. The analytical concepts 266 include:

- a field 268 concept, which is a finite set of database fields. Examples of field concepts include "Sales," and "Product Category";
- a value 270 concept, which is a finite set of values for a database field. Examples of value concepts include the value 10,500,000.00 for a Sales data field and the value "Chairs" for a Product Category data field;
- an aggregation 272 concept, which is a finite set of operators that aggregate the values of multiple rows to form a single value based on a mathematical operation. Examples of aggregation concepts include "sum," "average," "median," "count," and "distinct count";
- a group 274 concept, which is a finite set of operators that partitions the data into categories. An example of a group concept includes the "by" key value;
- a filter 276 concept, which is a finite set of operators that return a subset of rows from the database. Examples of filter concepts include "filter to," "at least," "between," and "at most";
- a limit 278 concept, which is a finite set of operators (akin to the filters 276) that return a subset of rows from the database, restricting to n rows, where 1≤n≤N, and N is the total number of rows in the domain. Examples of limit concepts include "top" and "bottom"; and
- a sort 280 concept, which is a finite set of operators that arranges data rows in an order. Examples of sort concepts include "ascending," "descending," and "alphabetical."

Figure 2D:
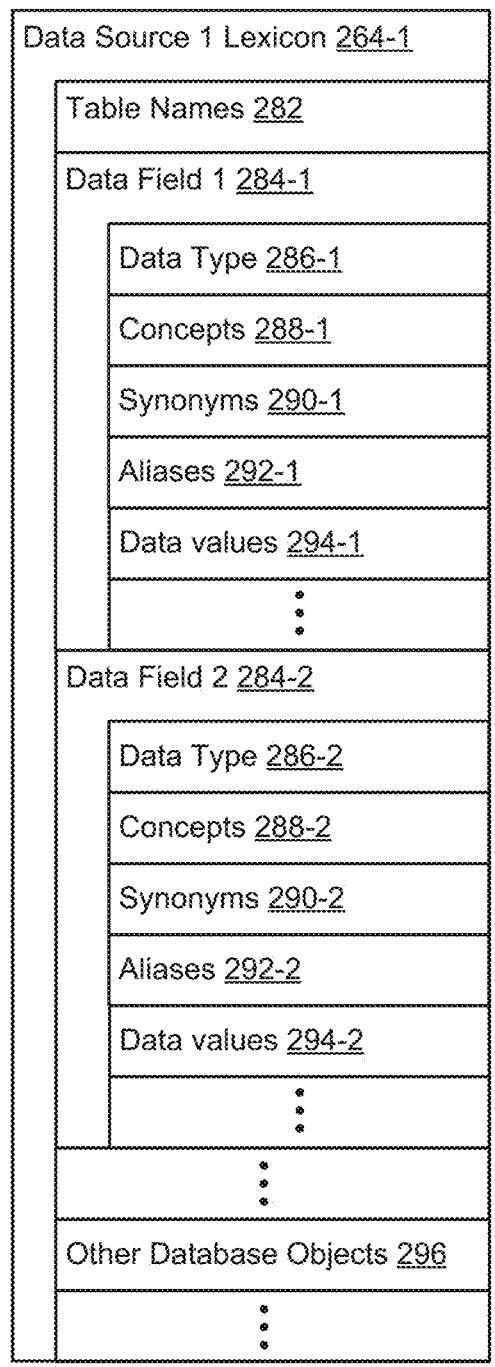

FIG. 2D is a block diagram illustrating components of a first data source lexicon 264-1, in accordance with some implementations. The first data source lexicon 264-1 includes table names 282 corresponding to names of one or more tables of the first data source 258-1, a plurality of data fields 284 of the first data source 258-1, and other database objects 296. Each data field 284 includes:

- a data type 286, such as integer, string, date, or floating point numeric;
- One or more concepts 288 that are used to interpret the data field. For example, a data value "Michael" may be interpreted using the concepts such as a "string," "name," "gender (e.g., male)," "singer," "basketball player," and/or "chef." In some implementations, the one or more concepts are derived from elastic searches;
- One or more synonyms 290, which are defined by the system. For example, a data field "average" may include synonyms such as "mean" and "avg";
- Zero or more aliases 292, which are defined by the user. For example, a data field "goods" may include aliases such as "widgets," "bananas," and "my favorite field"; and
- data values 294, which are some or all of the distinct values for a data field. This is particularly useful for low cardinality string data fields. In some instances, the set of stored data values 294 for a data field 284 in a lexicon 264 is limited to data values with threshold usage in the data field 284 (e.g., include a data value 294 in the lexicon when the data value appears in at least a threshold number of rows for the data field 284).

In some implementations, a data source lexicon 264 includes other database objects 296 as well.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these sub-modules are described in U.S. patent application Ser. No. 16/134,892, titled "Analyzing Natural Language Expressions in a Data Visualization User Interface, filed Sep. 18, 2018, which is incorporated by reference herein in its entirety.

Figure 3:
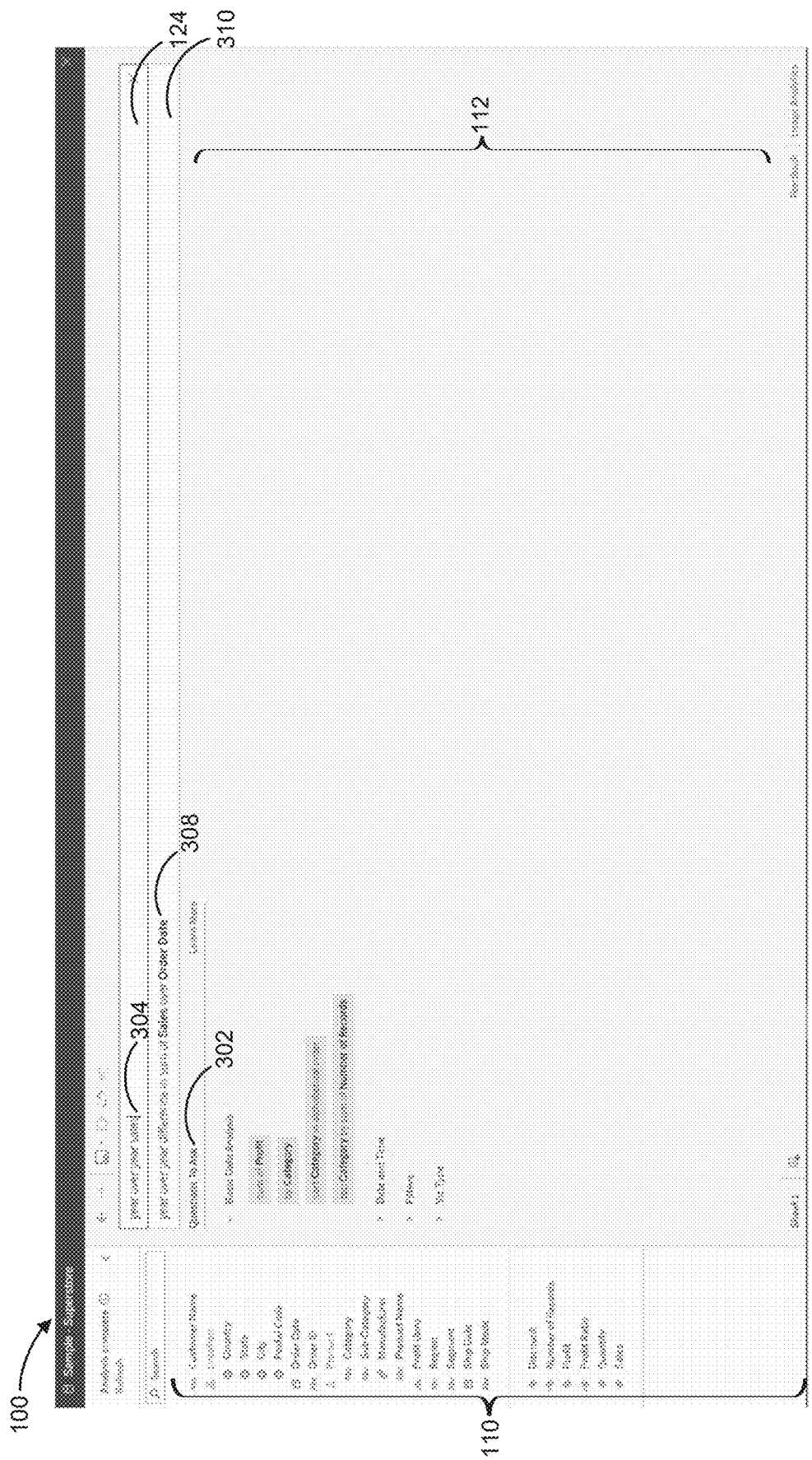
FIG. 3 provides a screenshot for a graphical user interface according to some implementations.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above FIG. 3 is a screen shot for a graphical user interface 100 according to some implementations. In some implementations, as illustrated in FIG. 3, the data visualization region 112 displays suggestions 302 (e.g., tips or pointers) to assist the user in interacting with the data source. Further details about the suggestions 302 are described in U.S. patent application Ser. No. 16/601,437, filed Oct. 14, 2019, entitled "Incremental Updates to Natural Language Expressions in a Data Visualization User Interface," which is incorporated by reference herein in its entirely.

In the example of FIG. 3, a user is interacting with a data source 258. The schema information region 110 provides named data elements (e.g., field names) from the data source 258, which may be selected and used to build a data visualization.

FIG. 3 illustrates a user interaction with the graphical user interface 100. In this example, the user inputs (e.g., enters or types) a natural language expression (e.g., a natural language command) 304 "year over year sales" in the command box 124. The user may also input the natural language expression by speech, which is then captured using an audio input device 220 (e.g. a microphone) coupled to the computing device 200. Typically, the natural language expression includes one or more terms that identify data fields from the data source 258. A term may be a dimension (e.g., categorical data) or a measure (e.g., a numerical quantity). As illustrated by the example, the natural language input typically includes one or more terms that correspond to database fields (e.g., the term "sales" identifies a data field from the data source).

In some implementations, parsing of the natural language expression is triggered in response to the user input. In this example, the natural language command 304 includes the terms "year over year," which specifies a table calculation type.

In response to the natural language command 304, the graphical user interface 100 displays an interpretation 308 (also referred to as a proposed action) in an interpretation box 310. In some implementations, as illustrated in FIG. 3, the field names "Sales" and "Order Date" are displayed in a visually distinctive manner (e.g., in boldface) relative to other words included in the interpretation 308.

Figure 4A:
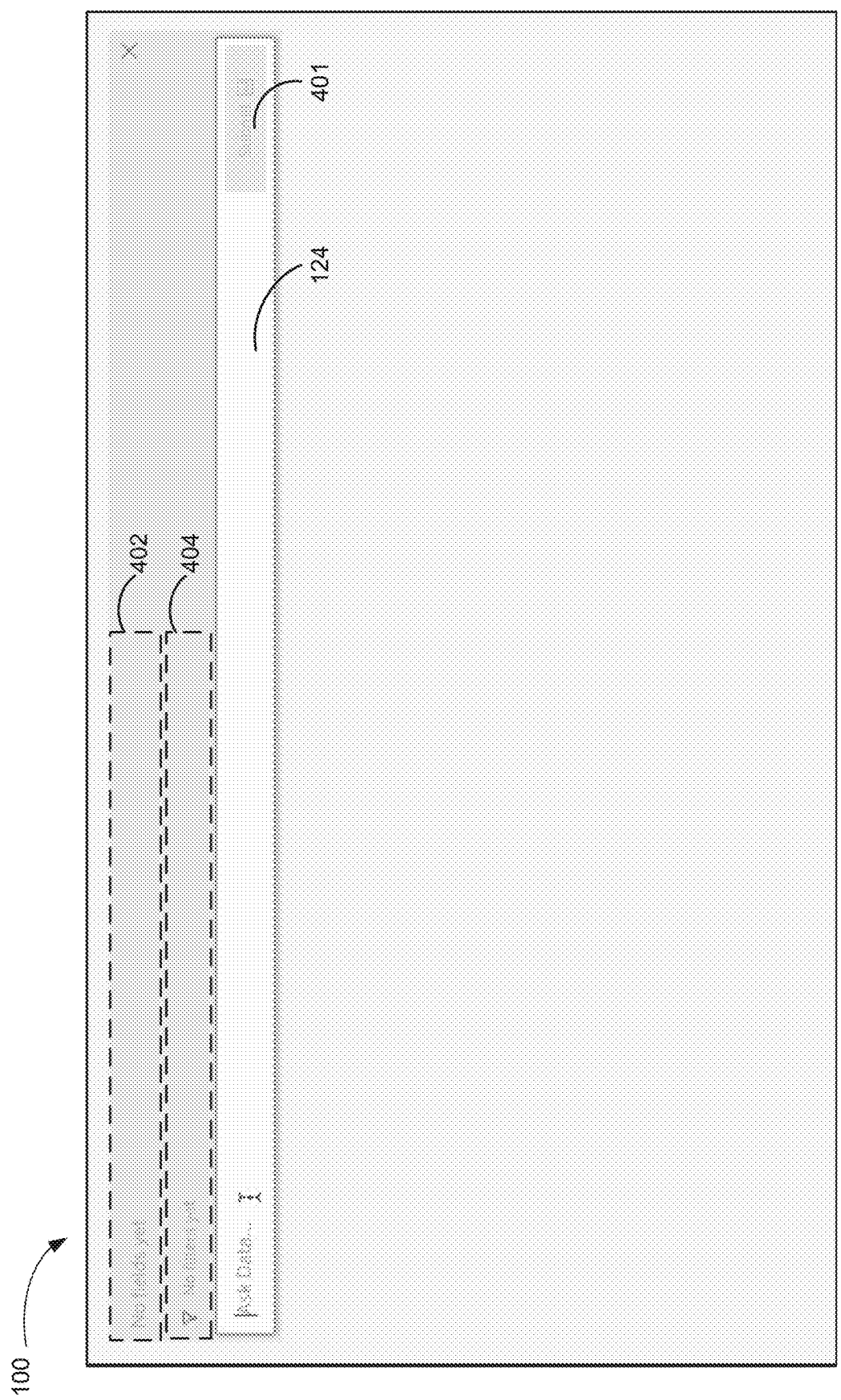
FIGS. 4A-4P provide a series of screen shots for interactions with a graphical user interface according to some implementations.
Figure 4B:
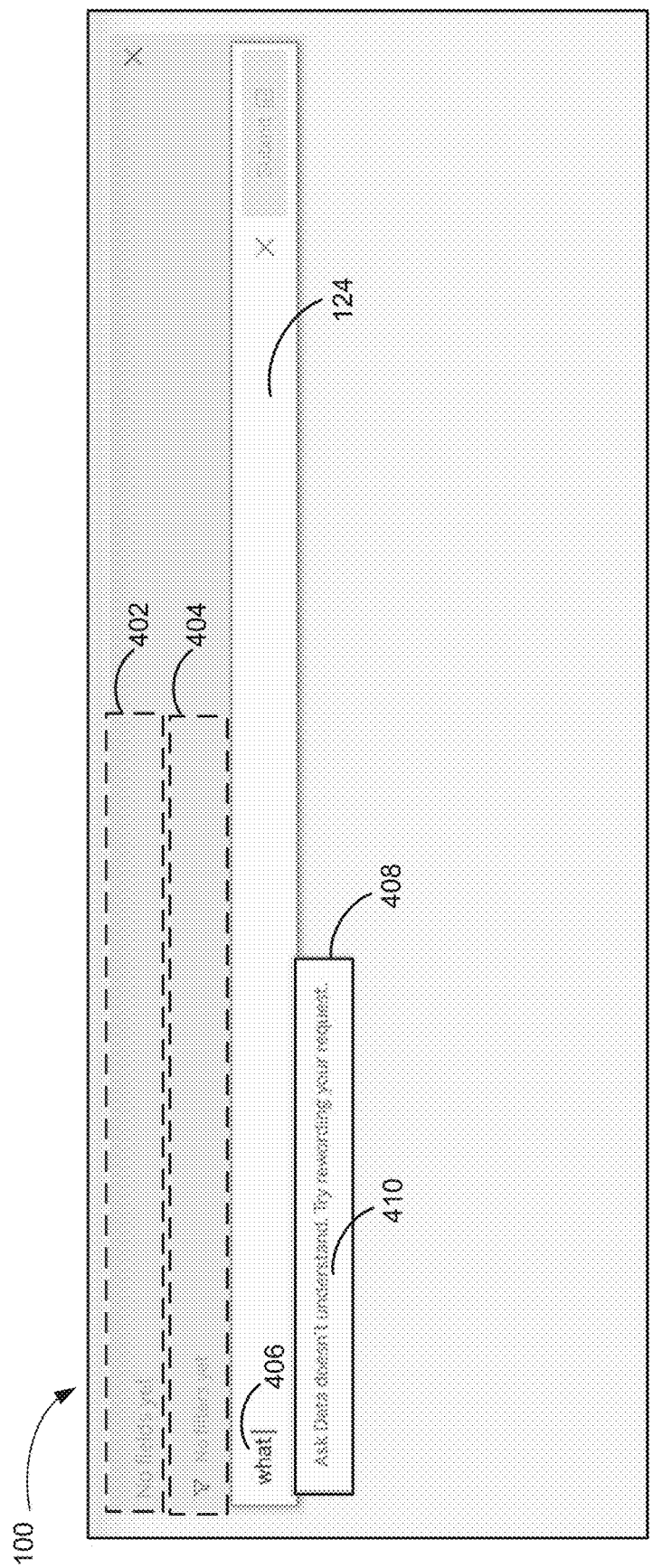
Figure 4C:
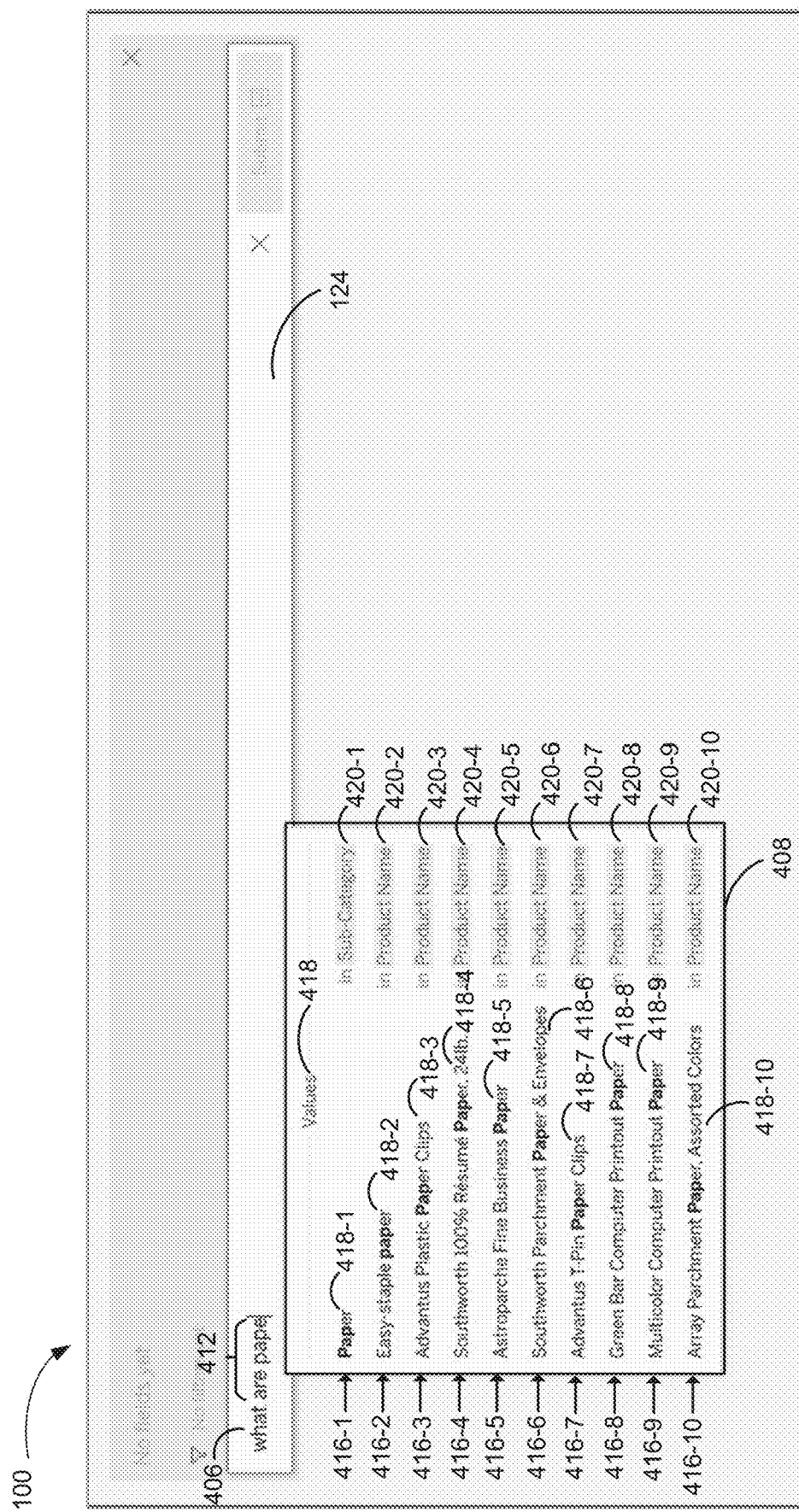
Figure 4D:
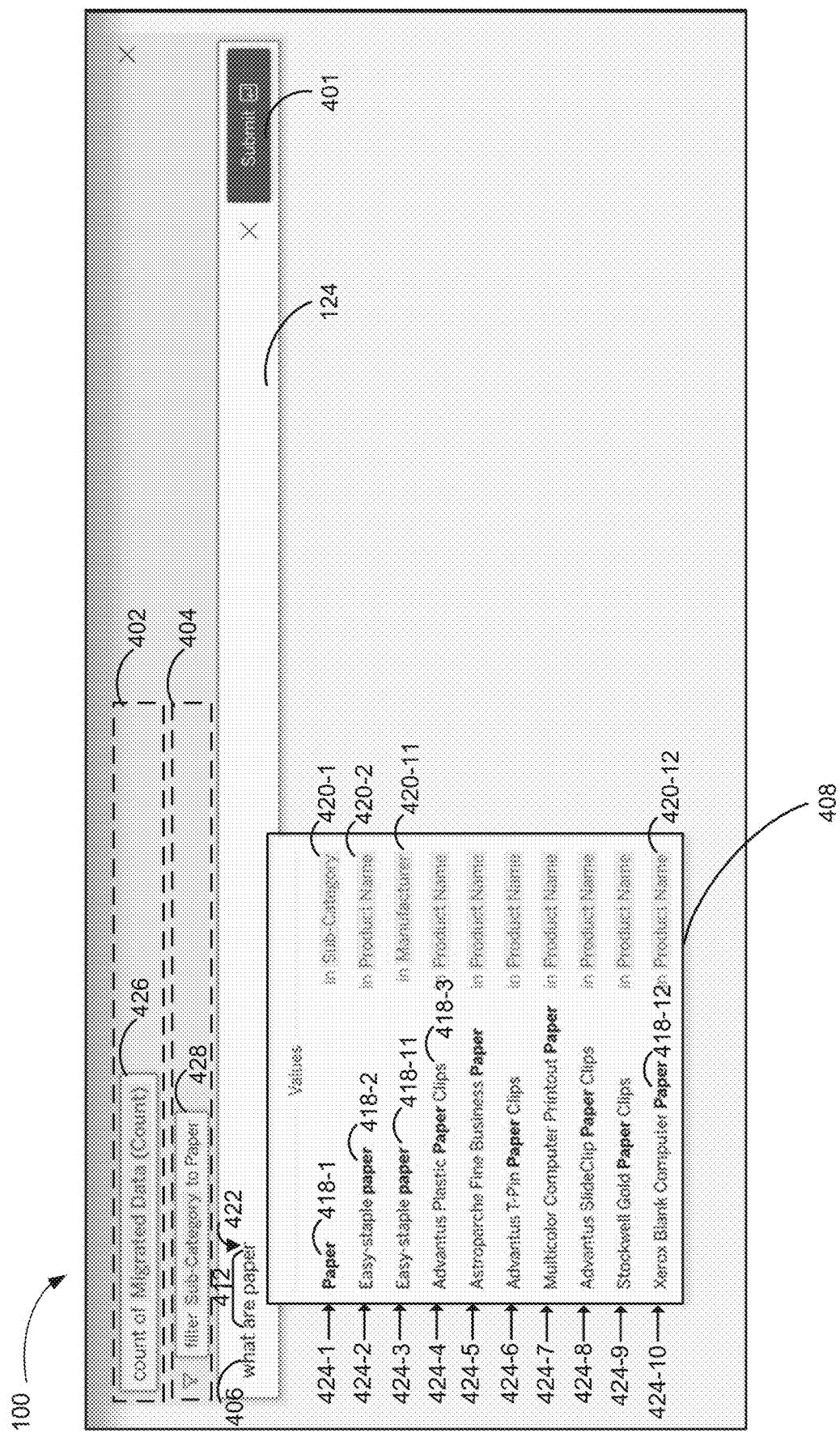
Figure 4E:
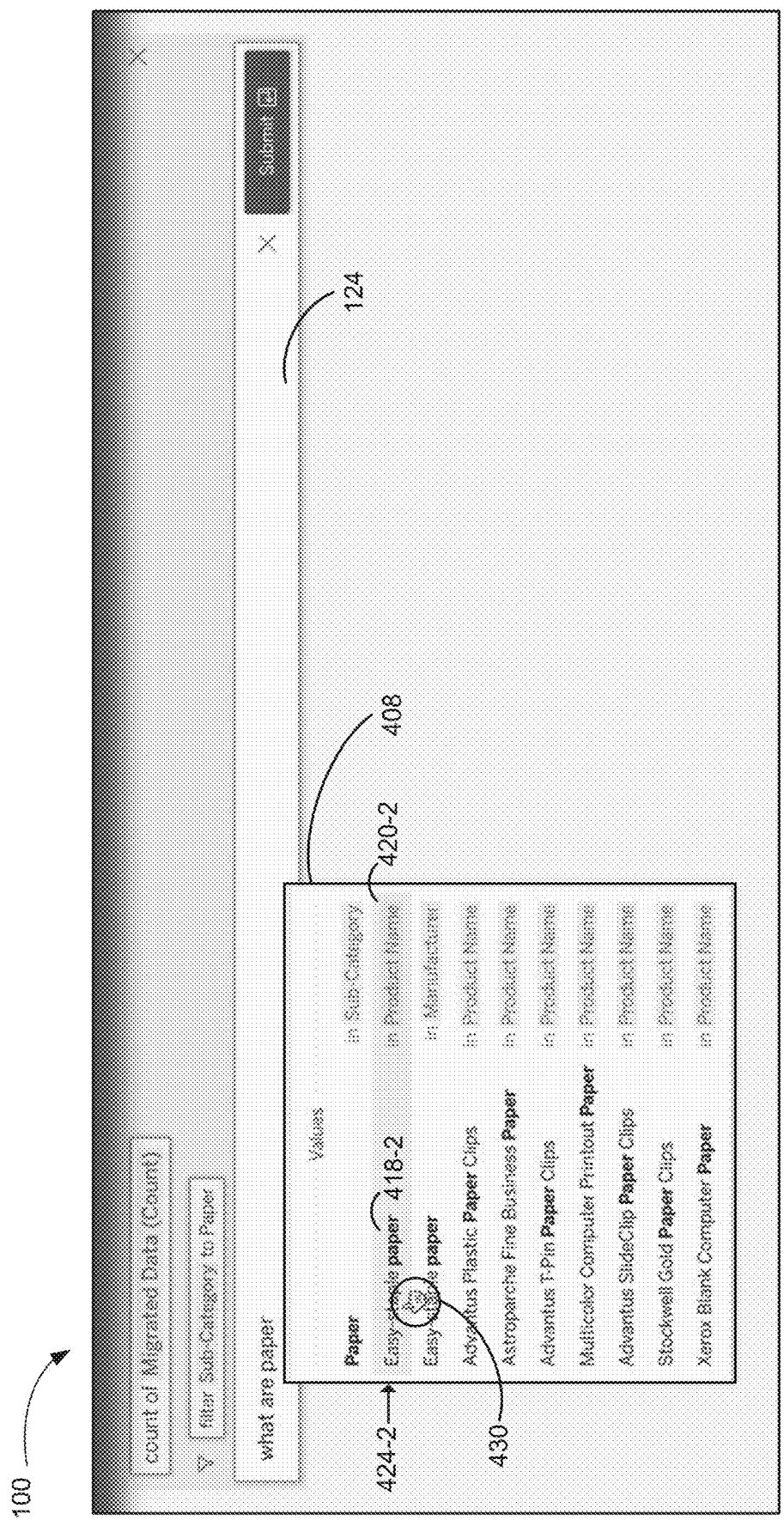
Figure 4F:
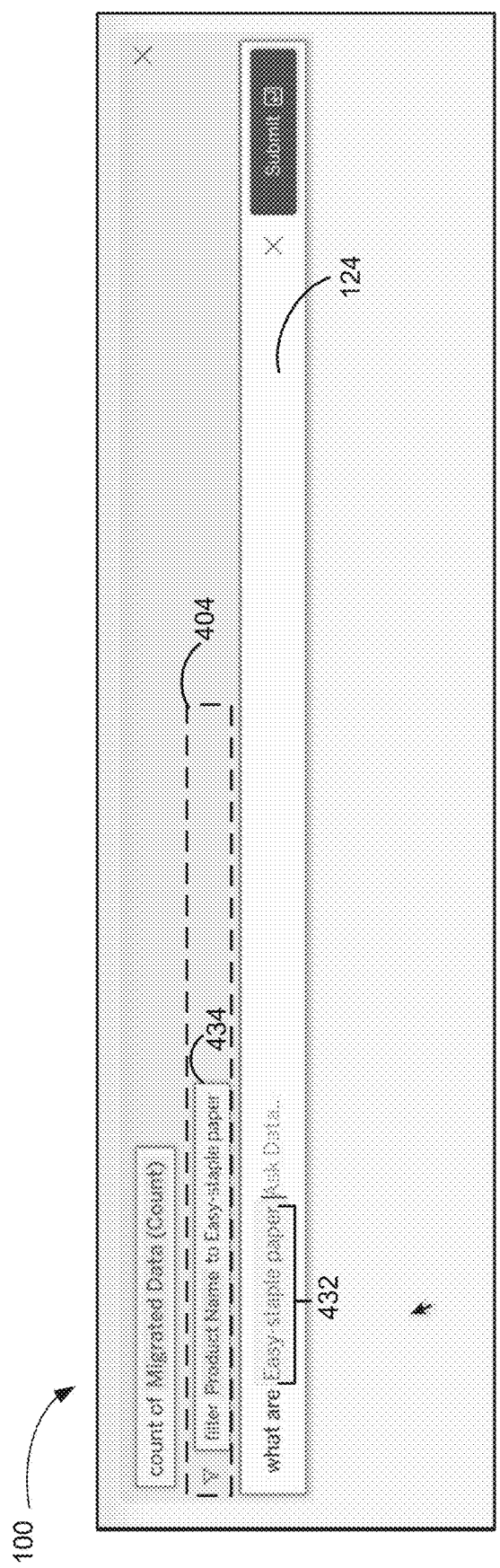
Figure 4G:
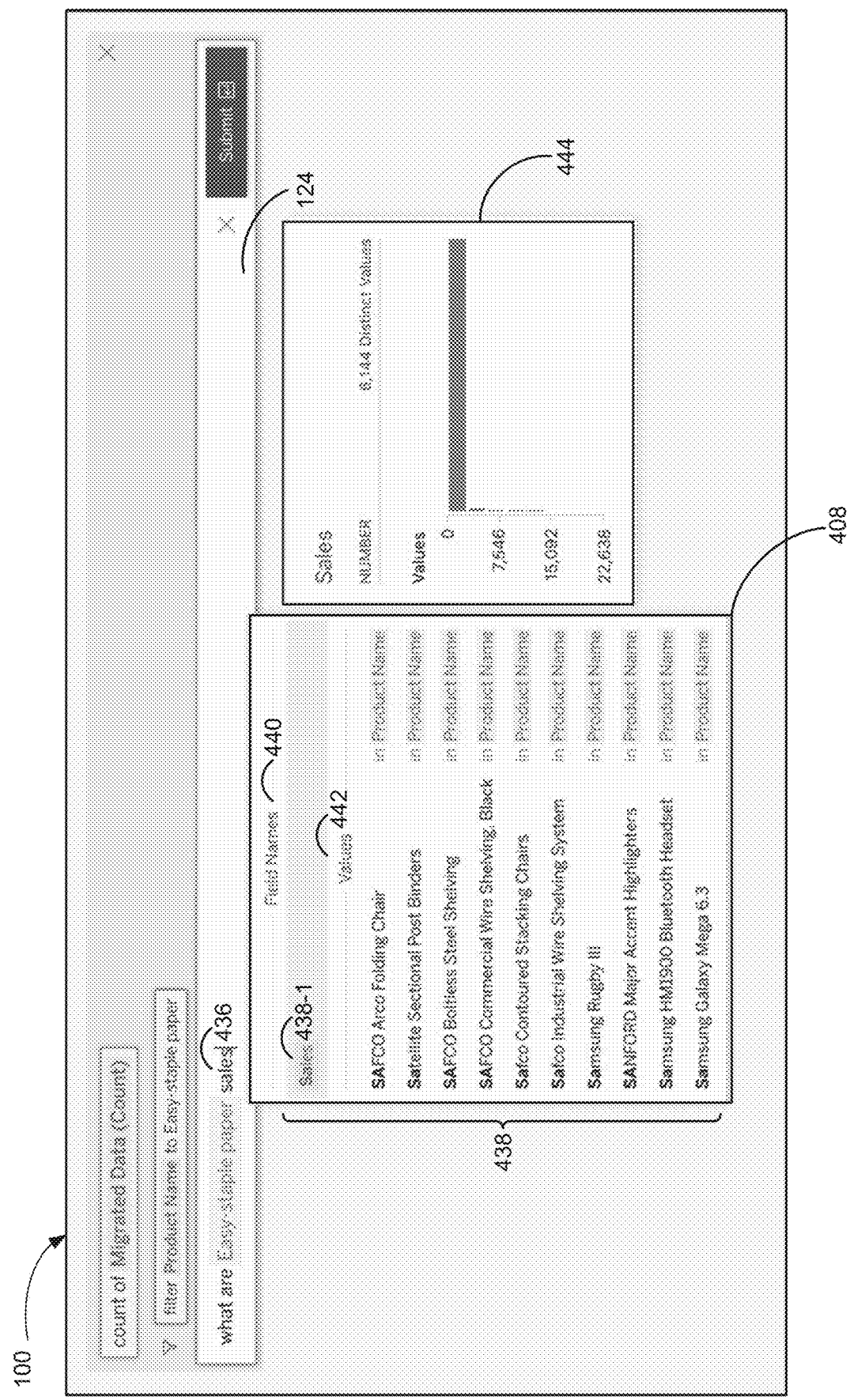
Figure 4H:
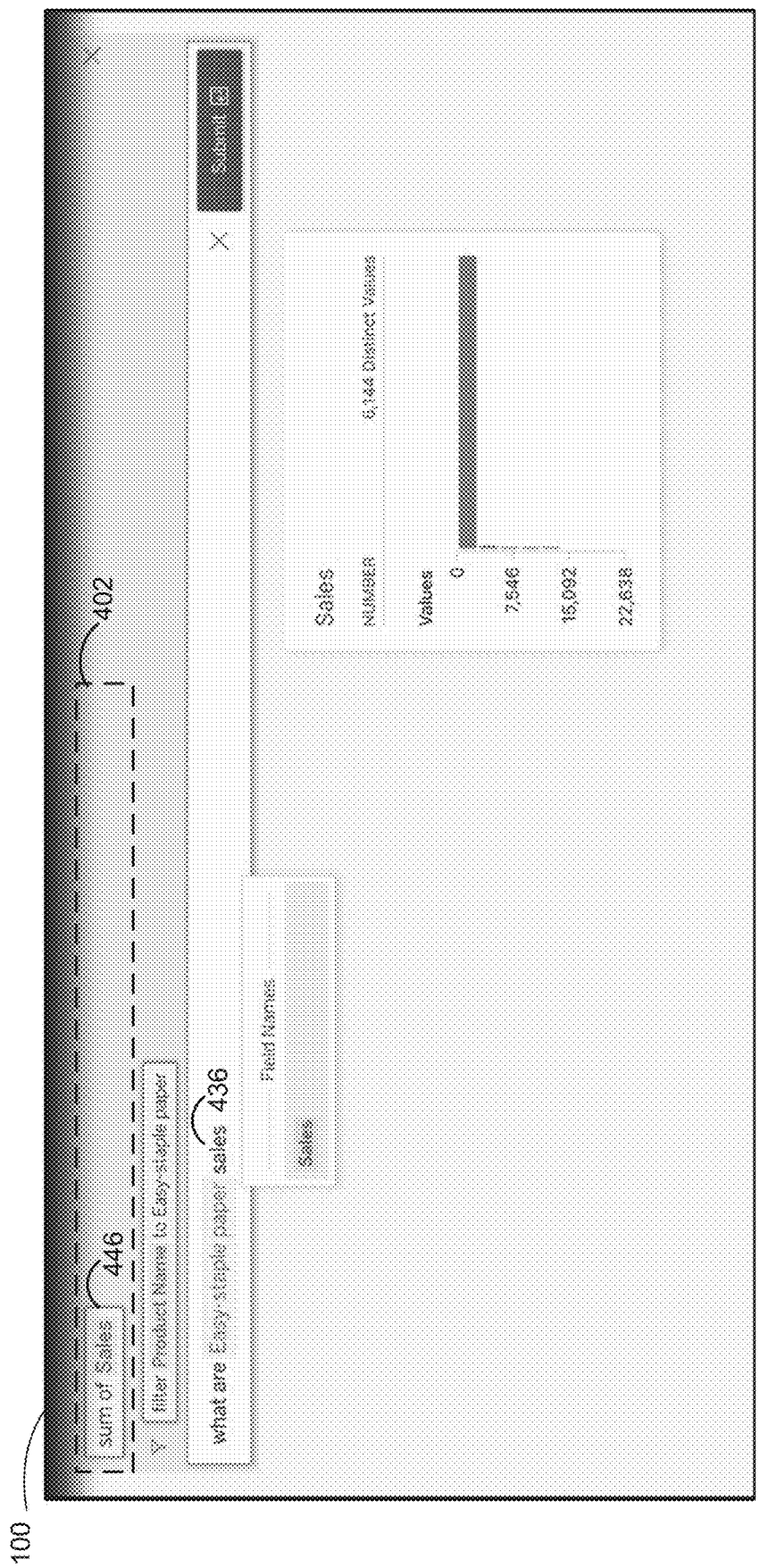
Figure 4I:
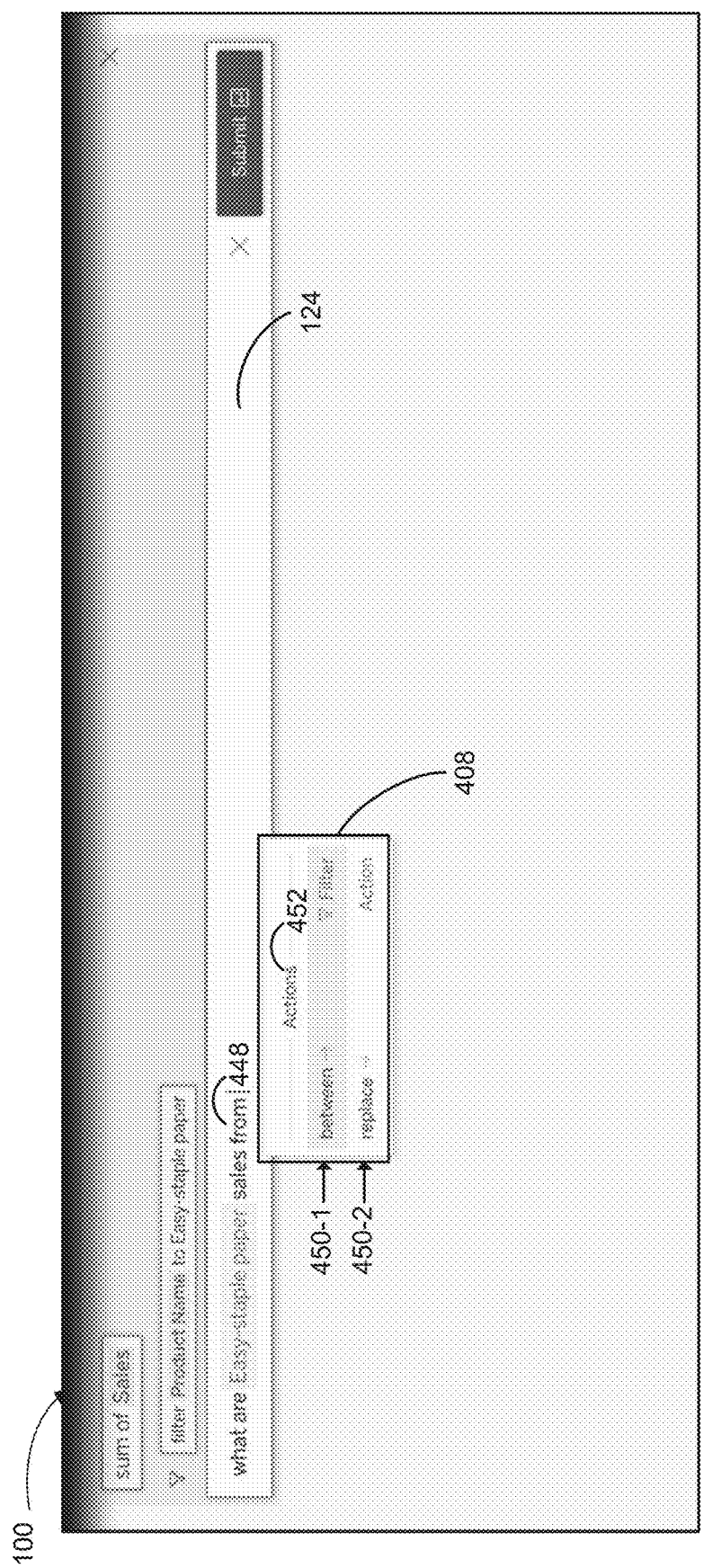
Figure 4J:
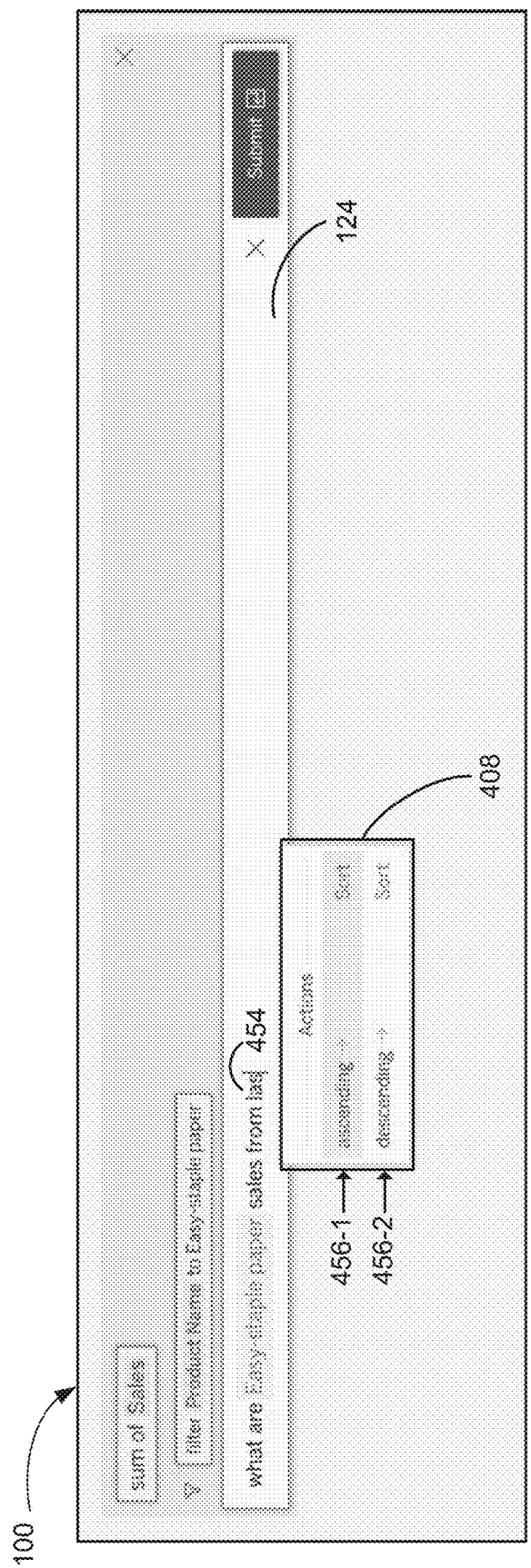
Figure 4K:
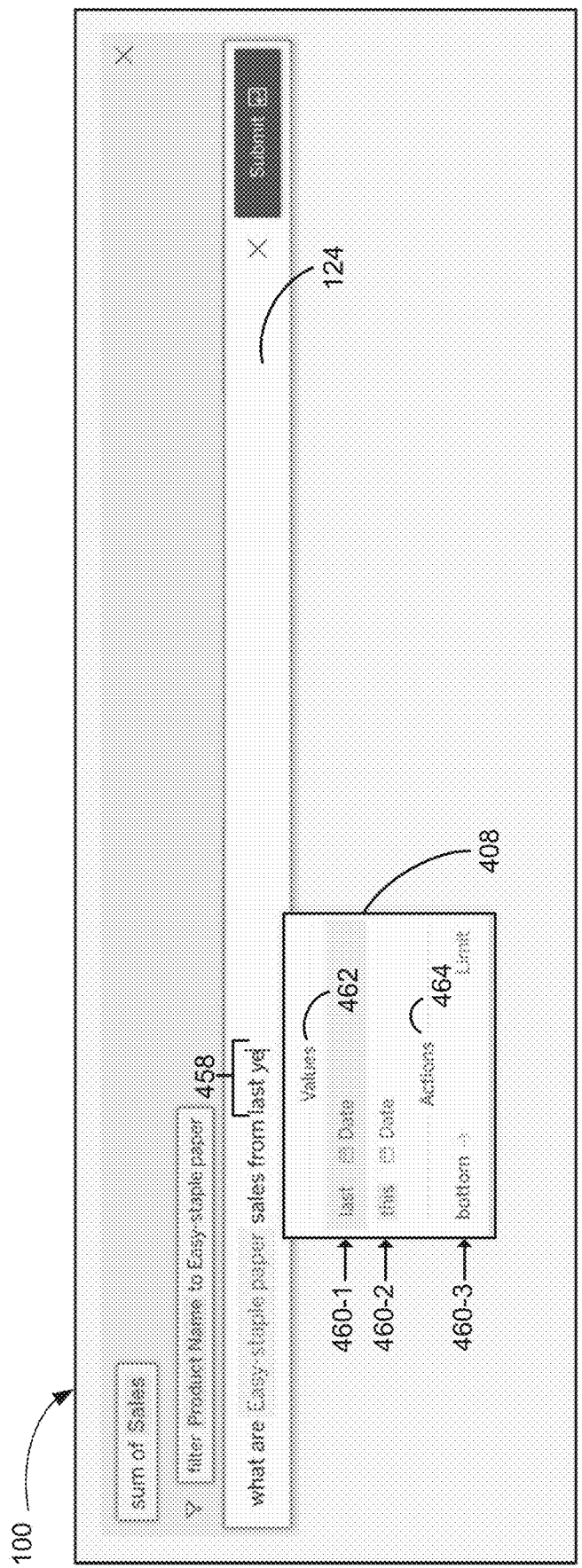
Figure 4L:
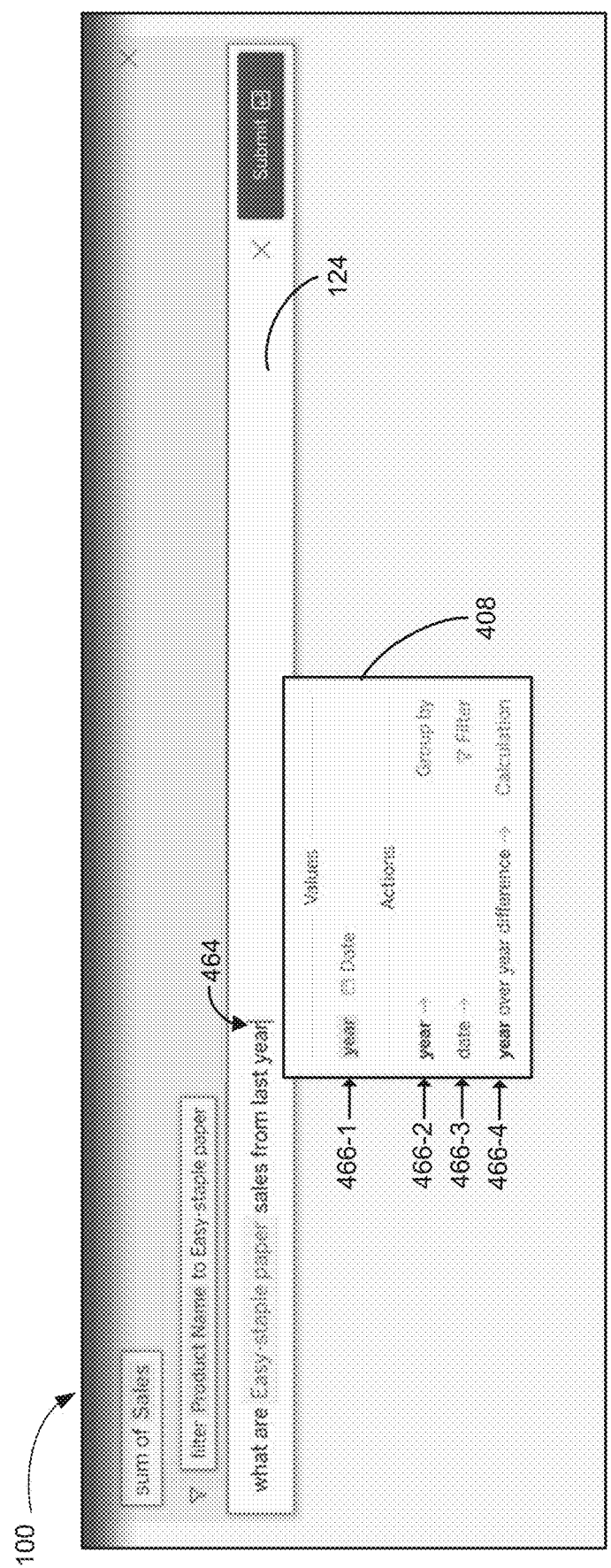
Figure 4M:
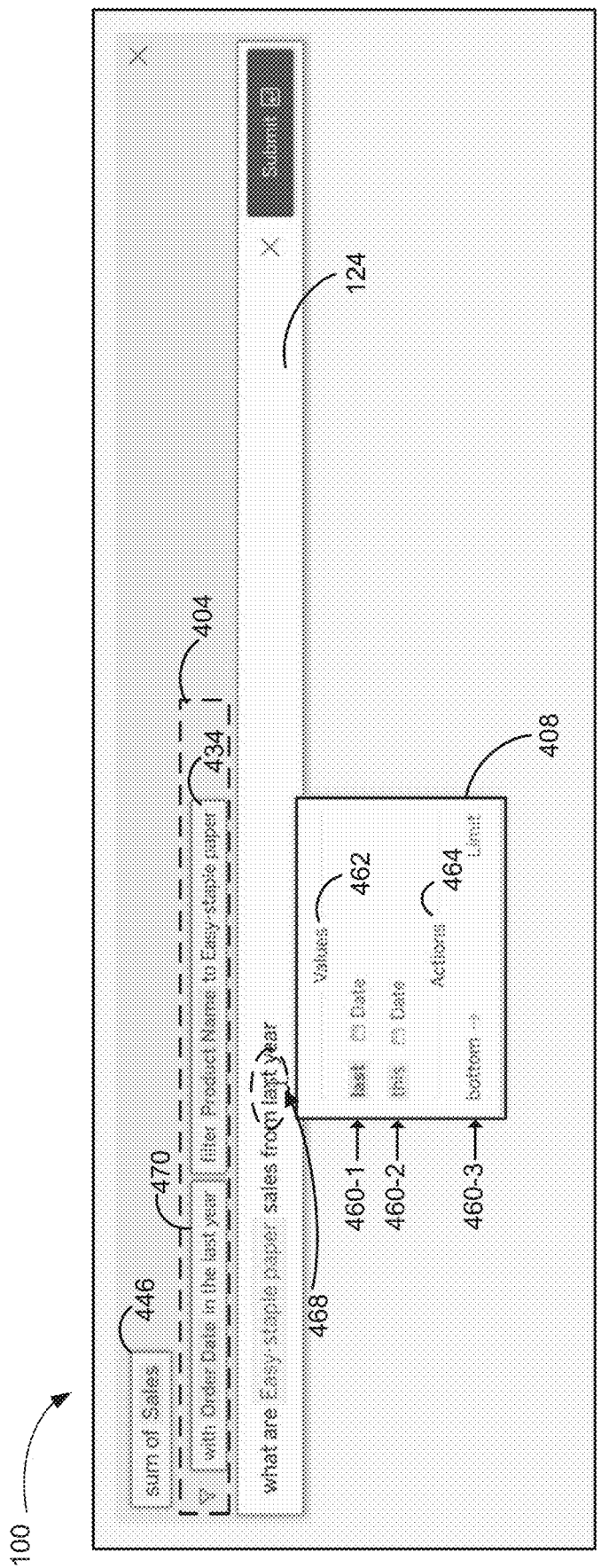
Figure 4N:
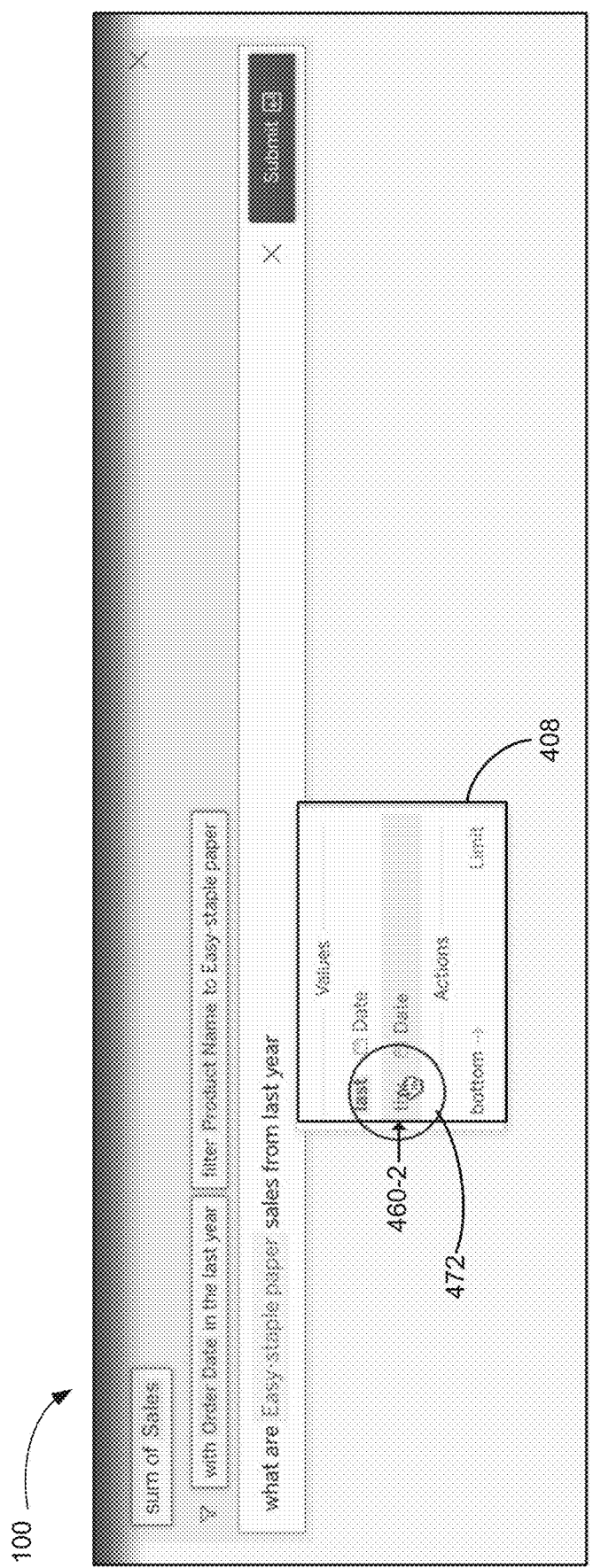
Figure 4O:
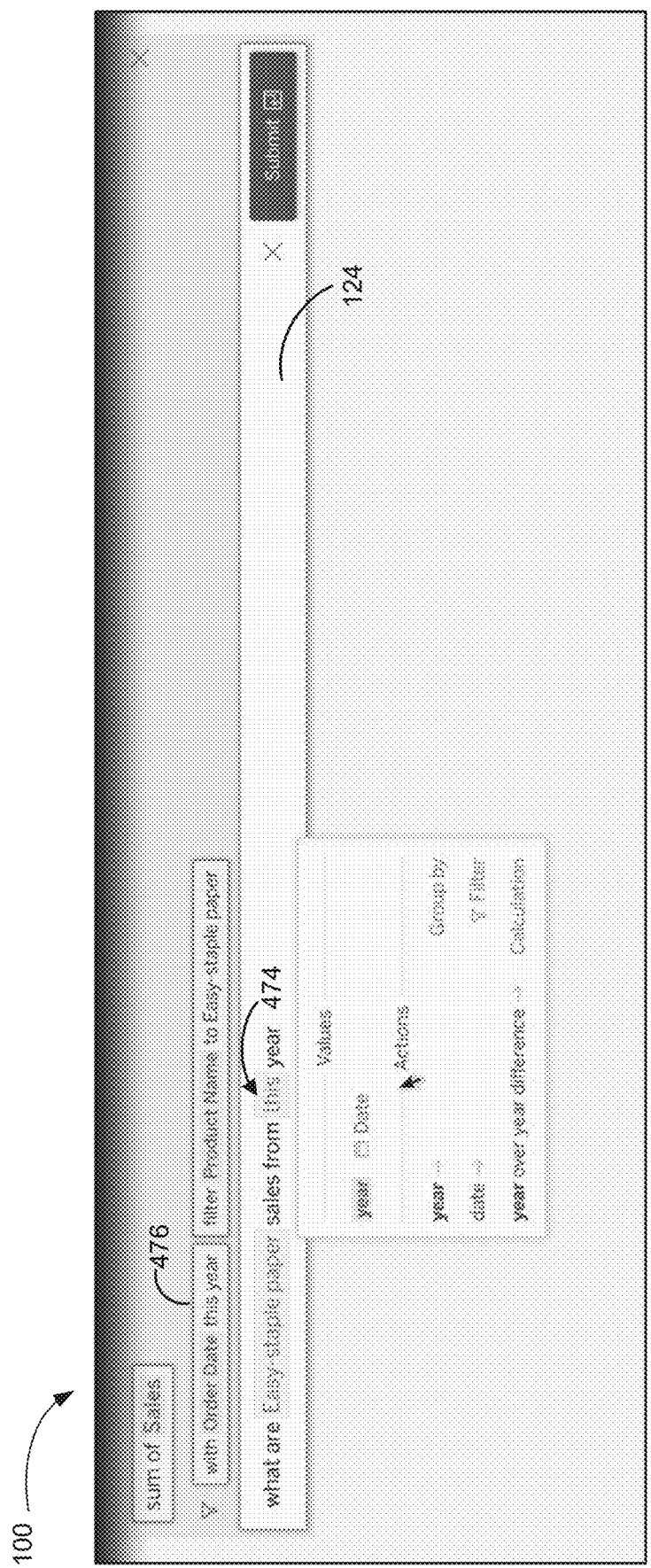
Figure 4P:
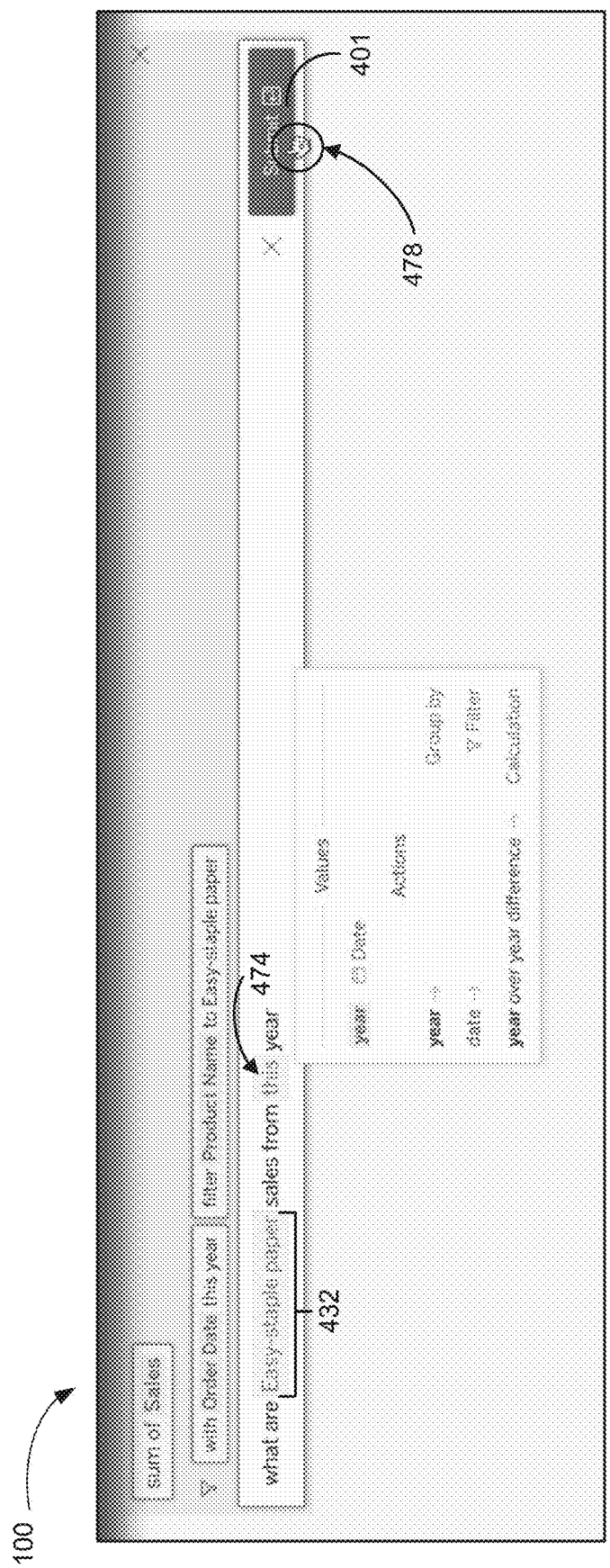
Figure 5A:
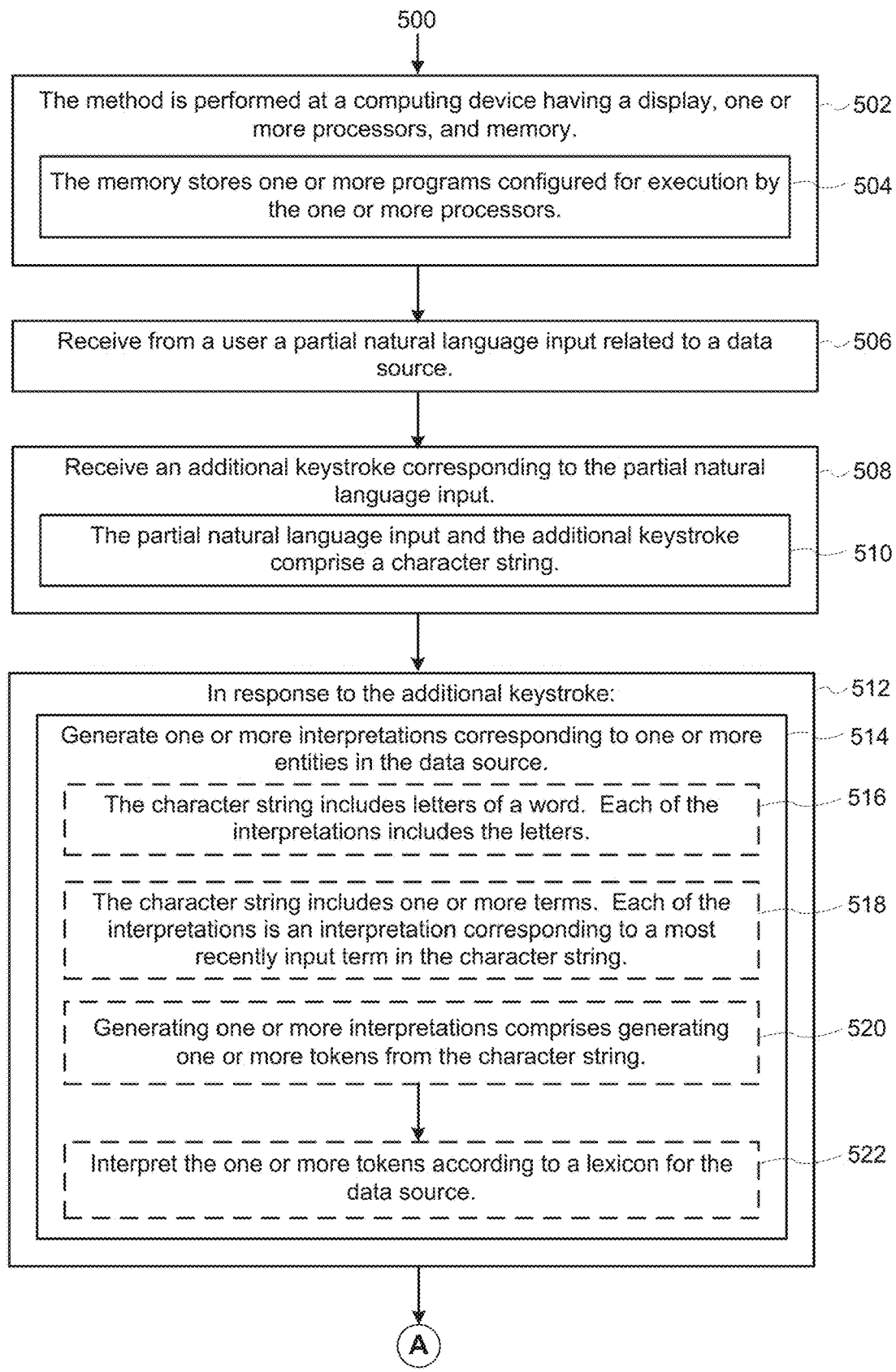
Figure 5B:
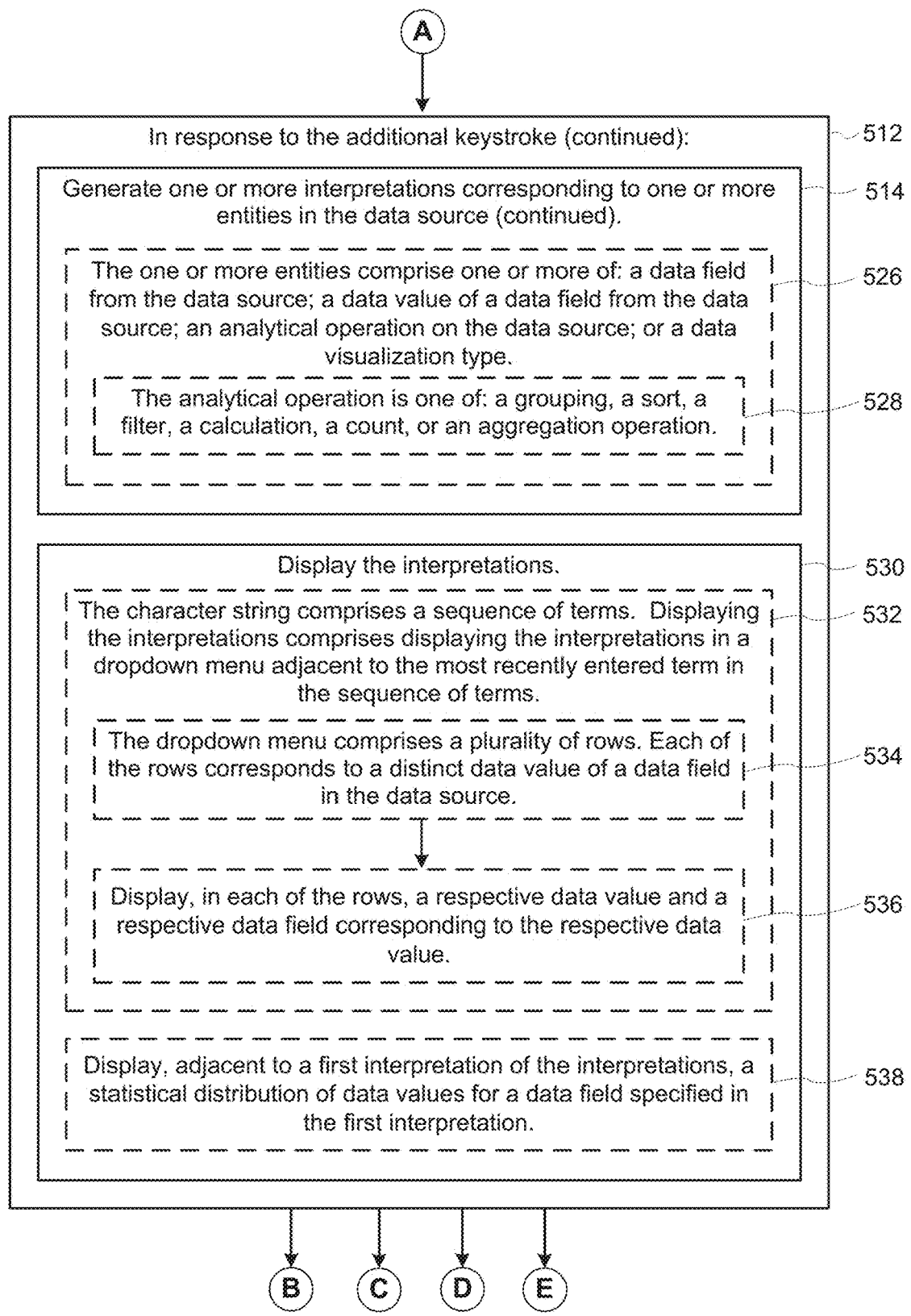

FIGS. 4A-4P provide a series of screen shots for a graphical user interface 100 according to some implementations.

FIG. 4A provides a screen shot for a partial view of a graphical user interface 100 according to some implementations.

In some implementations, as illustrated in FIG. 4A, the graphical user interface 100 comprises a natural language input box 124 for receiving natural language commands from a user. The natural language input box 124 includes a graphical control element 401 (e.g., a "Submit" affordance) that, when selected by a user, causes a natural language command in the input box 124 to be transmitted to the computing system 200 (e.g., the natural language system 236) for analysis and/or interpretation. In some implementations, the computing system 200 generates a visualization (e.g., a data visualization) in response to the analysis and/or interpretation and returns the visualization for display on the graphical user interface 100. In this example, the graphical control element 401 is deactivated (e.g., grayed out) because the graphical user interface 100 has yet to receive a natural language command.

In some implementations, the graphical user interface 100 also comprises a data field interpretation region 402 and a filter interpretation region 404, which are located adjacent to (e.g., above) the natural language input box 124. The data field interpretation region 402 displays how the natural language system 236 interprets the natural language input from a user in light of the selected data source. The filter interpretation region 404 displays the filter(s) that are applied to data fields of the data source 258 in response to the natural language input from the user. In this example, no interpretation is displayed in the regions 402 and 404 because the graphical user interface 100 has yet to receive a natural language command.

FIG. 4B illustrates a user interaction with the graphical user interface 100. In this example, the user inputs (e.g., enters or types) a partial natural language expression 406 "what" into the command box 124. In general, the expression can be a command, an input, or an utterance that includes partial or incomplete words, phrases, and/or sentences. The user may also input the natural language expression by speech, which is then captured using an audio input device 220 (e.g. a microphone) coupled to the computing device 200. In response to the natural language command 406, the graphical user interface 100 displays a dropdown menu 408 that includes a statement 410 (e.g., "Ask Data does not understand. Try rewording your request.") Typically, a natural language expression includes one or more terms that identify entities (e.g., a data field, a data value of a data field, an analytical operation, and/or a data visualization type) from the data source 258. In this example, the natural language system 236 generates and displays the statement 410 because it is unable to identify an entity of the data source 258 that corresponds to the partial language expression 406.

FIG. 4C illustrates another user interaction with the graphical user interface 100. In this example, the user inputs additional keystrokes 412 (e.g., "are pape") corresponding to the partial natural language input 406 in FIG. 4B. In response to the additional keystrokes 412, the graphical user interface 100 displays a plurality of interpretations 416 (e.g., search results or entity search results) in the dropdown menu 408. Each of the interpretations 416 is generated by the natural language system 236 and includes an entity from the data source 258. In the example of FIG. 4C, each of the interpretations 416 identifies a distinct data value 418 in the data source 258 and its corresponding data field 420. Each of the data values 418 contains the letters "pap" corresponding to the keystrokes "pap" of the most recently entered term "pape". As illustrated in FIG. 4C, the letters "pap" in the interpretations 416 are displayed in a visually distinctive manner (e.g., boldface) from the remaining characters of the data value 418.

In some implementations, as illustrated in FIGS. 4B and 4C, the position of the dropdown menu 408 changes based on the position of a most recently entered term (or keystroke) in the natural language input box 124. In FIG. 4B, the dropdown menu 408 is located immediately below the partial natural language command 406 (e.g., "What"). In FIG. 4C, the dropdown menu 408 is displaced further to the right compared to that in FIG. 4B, and is located immediately below the most recently entered keystrokes "pape". Stated another way, the dropdown menu 408 is located immediately below the substring of the input text that corresponds to the displayed search results (e.g., the input text "What" in FIG. 4B and the input text "pape" in FIG. 4C).

FIG. 4D illustrates another user interaction with the graphical user interface 100. In this example, the user inputs one additional keystroke 422 (i.e., the letter "r"), which is appended to the partial natural language input "what are pape" in FIG. 4C. In response to the additional keystroke 422, the graphical user interface 100 displays updated interpretations 424 (e.g., updated search results or updated entity search results). Each of the interpretations 424 identifies a distinct data value 418 for a data field 420 from the data source 258.

In the example of FIG. 4D, each of the data values 418 in the interpretations 424 includes the word "Paper," which is a combination of the keystrokes 412 (e.g., "pape") and the additional keystroke 422 (e.g., the letter "r"). In some implementations, a partial natural language input (e.g., "what are pape", the keystrokes 412 "are pape," or the combination of the keystrokes 412 and the additional keystroke 422 that forms "paper") comprise a character string. A character string may include a string of letters that forms part of a word, such as the letters "dis" of the word "distribution." A character string may be a word (e.g., "sales", "price," or "profit). A character string may be more than one word, separated by a white space between words, e.g., "San Francisco." A character string may include complete words as well as letters of a word.

In the example of FIG. 4D, the keystroke 422 (e.g., the letter "r") is appended to the end of the partial natural language input "what are pape." In some implementations, the user may click on any portion of the partial natural language input and append the keystroke at that position.

In some implementations, the natural language system 236 generates one or more tokens from the character string. A token may include one letter (e.g., a letter of a word, such as the latter "r"), two letters, three or more letters (e.g., letters of a word), one word (e.g., the word "paper"), two or more words, and/or one or more phrases that is formed by combining two or more consecutive words.

Referring again to FIG. 4D, the natural language system 236 concatenates the keystrokes 412 and the additional keystroke 422 to form the token "paper" (e.g., a word), and interprets the token according to the data source 258 and/or a lexicon 264 for the data source 258. The process of tokenization is also described in U.S. patent application Ser. No. 16/166,125, filed Oct. 21, 2018, titled "Determining Levels of Detail for Data Visualizations Using Natural Language Constructs," which is hereby incorporated by reference herein in its entirety.

As shown in FIG. 4D, a subset of the interpretations 424 overlap with (e.g., are the same as) the interpretations 416 that are illustrated in FIG. 4C. For example, the interpretation 424-1 and the interpretation 416-1 both contain the data value 418-1 (i.e., "Paper") and the data field 420-1 (i.e., "Sub-Category"). Some of the interpretations 424 are different from the previous interpretations 416. For example, FIG. 4D includes the interpretation 424-3 (e.g., having the data value 418-11 "Easy-staple paper" and the data field 420-11 "Manufacturer") and the interpretation 424-10 (e.g., having the data value 418-12 "Xerox Blank Computer Paper" and the data field 420-12 "Product name"), which are not present in the interpretations 416. Furthermore, the order in which an interpretation is displayed may also modified as a result of an additional keystroke in the partial natural language input. For example, the data value 418-3 (e.g., "Advantus Plastic Paper Clips"), which appears as the third item in the interpretations 416 in FIG. 4C, is displayed as the fourth interpretation 424-4 in FIG. 4D.

In some implementations, as illustrated in FIG. 4D, in response to the additional keystroke 422, the graphical user interface 100 displays in the data field interpretation region 402 a default data field 426 (e.g., "count of Migrated Data (Count)"), which the natural language system 236 has selected from the data source 258 based on the partial natural language command. The graphical user interface 100 also displays in the filter interpretation region 404 a default filter 428 based on the partial command (e.g., based on the first interpretation 424-1 in the list 408). In this example, the natural language system 236 suggests adding a filter operation that filters rows of the data source to include only those whose "Sub-Category" data field have the value "Paper". In some implementations, the expressions that are displayed in the data field interpretation region 402 and/or in the filter interpretation region 404 are also known as full interpretations or complete interpretations. In some implementations, the interpretations that are displayed in the dropdown menu 408 (e.g., interpretations 424 in FIG. 4D) are also known as partial interpretations.

In some implementations, when one or more terms in the partial natural language command include one or more terms that are recognized by the natural language system 236 (e.g., after the graphical user interface displays interpretations such as the interpretations 416, the interpretations 424, the default count 426 and/or the default filter 428), the graphical control element 401 becomes activated. A user may at this point select the graphical control element 401 to cause the partial natural language command in the input box 124 to be transmitted to the data visualization application 230 for analysis (using the first interpretation). Alternatively, the user may continue to modify the partial language command, such as input additional keystrokes, modify or delete existing terms, and/or select an alternative interpretation.

FIG. 4E illustrates a user interaction with the dropdown menu 408. In this example, the user selects (430) the second interpretation 424-2.

FIG. 4F illustrates the response to user selection of the second interpretation 424-2 in FIG. 4E. The term (e.g., a word) "paper" in the partial natural command is replaced by an updated term 432 (e.g., "Easy-staple paper"), corresponding to the data value 418-2 in the interpretation 424-2. The term 432 is displayed in a visually distinct manner (e.g., visually emphasized, with a distinct font color or font type) compared to the other terms (e.g., "what are") in the partial natural language command. The default filter 428 in the filter interpretation region 404 is also replaced by an updated filter 434 (e.g., "filter Product name to Easy-staple paper").

In some implementations, user selection of an interpretation (e.g., the interpretation 424-2) corresponding to a term in the partial language command causes the term to be annotated by the natural language system 236. The updated term 432 in FIG. 4F is an example of an annotated term. Annotation in this context means that the user has instructed the natural language system 236 to interpret a term (e.g., a word or a phrase) in the input (e.g., natural language utterance, command, and/or question) as a reference to a particular entity in the data source 258 (e.g., as a data field, a data value, and/or an analytical concept). In this example, the user has indicated to the natural language system 236 that the user would like the term "paper" to be interpreted" as the product name "Easy-staple paper." Subsequently, when the natural language system 236 is interpreting the natural language utterance (e.g., after the user has input the entire natural language command), the natural language system 236 no longer has to identify the meaning of the term (e.g., word or phrase) as it is synthesizing a viable response.

In some instances, there may be inherent ambiguity associated with a term in a natural language command (e.g., there are many ways in which the term may be interpreted), as illustrated by the many possible interpretations 424 generated by the natural language system 236 in FIG. 4D. Thus, by giving the user control over how a term in a partial natural language utterance should be disambiguated, the natural language system 236 will be able to generate more accurate output (e.g., data visualizations) that meet the user's goals.

In some implementations, a user can interact with (e.g., hover over, click, or select) the graphical user interface 100 using an input device such as a mouse (e.g., the keyboard/mouse 216). In some implementations, the data visualization application 230 also includes one or more keyboard shortcuts, which provide an alternative (or additional) way for the user to interact with the graphical user interface 100. In some implementations, the keyboard shortcuts include one or more of: the <Tab> key, the <Down> key (e.g., the down arrow key on the keyboard), the <Up> key (e.g., the up arrow key on the keyboard), and the <Enter> key.

In some implementations, the keyboard shortcuts include the <Tab> key. User input of the <Tab> key selects an interpretation (e.g., an entity search result) from the dropdown menu 408. For example, in FIG. 4E, the user inputs (e.g., presses or uses) the <Tab> key on the keyboard to select the interpretation 424-2 (e.g., in addition to or instead of using a mouse). In some implementations, in accordance with the user input, the data visualization application 230 annotates the corresponding text with the selected expression without the user having to use a mouse.

In some implementations, the keyboard shortcuts include the <Down> key. For example, user input of the <Down> key causes the data visualization application 230 to focus (e.g., visually emphasize) on one interpretation (e.g., an entity search result) in the dropdown menu 408, but does not select that interpretation. In some implementations, the focused state visually corresponds to a hovered state using a mouse (e.g., how the interpretation appears when a user hovers over it with the cursor). When the user inputs the <Down> key again, the currently focused interpretation is defocused and the next interpretation in the dropdown menu 408 (e.g., an interpretation that is located immediately below the current interpretation) becomes focused. In some circumstances, when the last interpretation in the dropdown menu 408 (e.g., the interpretation 416-10 in FIG. 4C) is already focused, a subsequent user input of the <Down> key has no effect (e.g., the focus is maintained at the last row).

In some implementations, the keyboard shortcuts also include the <Up> key (e.g., the "up" arrow key). In some implementations, user input of the <Up> key defocuses a current interpretation and focuses on a previous interpretation in the dropdown menu 408 (e.g., an interpretation that is located immediately above the current interpretation). In some circumstances, when the topmost interpretation in the dropdown menu 408 (e.g., the interpretation 416-1 in FIG. 4C) is already focused, subsequent user input of the <Up> key removes the focus (e.g., no interpretation in the dropdown menu 408 will be focused).

In some implementations, the keyboard shortcuts also include the <Enter> key, which selects a focused interpretation from the dropdown menu 408. In some implementations, when the dropdown menu 408 does not include a focused interpretation and there is a valid interpretation for the query, user input of the <Enter> key causes the interpretation to be submitted (e.g., sent) to the data visualization application 230. In some implementations, in response to the submission, the data visualization application 230 generates a data visualization and returns the data visualization for display on the graphical user interface 100. In some implementations, the graphical user interface 100 already includes (e.g., displays) a data visualization. In this situation, in response to the submission, the data visualization application 230 generates an updated data visualization and returns the updated visualization for display on the graphical user interface 100. In some implementations, if the dropdown menu 408 does not include a focused interpretation and there is no valid interpretation, user input of the <Enter> key does not produce any effect.

FIG. 4G illustrates another user interaction with the graphical user interface 100. In this example, the user appends a term 436 (e.g., "sales") after the partial natural language command "what are Easy-staple paper" in the natural language input box 124. In response to the user input, the graphical user interface 100 displays a dropdown menu 408 adjacent to (e.g., below) the most recently entered term 436. The dropdown menu 408 contains interpretations 438 corresponding to the term 436. The interpretations 438 are further categorized into field names 440 and values 442. The data visualization application 100 also displays a statistical distribution 444 (e.g., a histogram) of data values for a first interpretation 438-1 "Sales", which is a numerical data field (e.g., a measure).

FIG. 4H illustrates that in response to user selection of the first interpretation 438-1 in FIG. 4G, the graphical user interface 100 replaces the default count 426 in the data field interpretation region 402 with an updated data field interpretation 446 ("sum of Sales").

FIG. 4I illustrates user input of another term 448 (i.e., the word "from") next to the partial natural language input "what are Easy-staple paper sales." In this example, the natural language system 236 interprets the term 448 according to a grammar lexicon 262 and generates interpretations 450 that are proposed actions 452 based on analytical concepts 266 from the grammar lexicon 262. The interpretations 450 includes a first interpretation 450-1 corresponding to a filter action (e.g., "between" two values of a data field) and a second interpretation 450-2 corresponding to a "replace" action.

FIG. 4J illustrates another user interaction with the graphical user interface 100. In this example, the user inputs the additional term 454 "las" (e.g., keystrokes or a partial word) next to the partial natural language command "what are Easy-staple paper sales from." In response to the user input, the graphical user interface 100 displays in the dropdown menu 408 a first interpretation 456-1, corresponding to an operation to sort in an ascending order (e.g., sort "Sum of Sales" in an ascending order), and a second interpretation 456-2, corresponding to an operation to sort in a descending order (e.g., sort "Sum of Sales" in a descending order). Note that these two interpretations correspond to the two terms "from las", as indicated by the horizontal position of the dropdown menu 408.

FIG. 4K illustrates another user input comprising additional keystrokes 458 "last yea" (e.g., a partial term) to the partial natural language input "what are Easy-staple paper sales from." In response to the user input, the dropdown menu displays three interpretations 460 corresponding to the terms "sales from last ye". Here, the interpretations 460 include data values 462 of data fields in the data source 258 and analytical operations (e.g., actions 464) on the data source 258. For example, the interpretations 460-1 and 460-2 are values (e.g., "this" or "last") of the data field "Date," and the interpretation 460-3 contains a limit term "bottom."

FIG. 4L illustrates another user input comprising an additional keystrokes 464 "ar" to the partial natural language input "what are Easy-staple paper sales from last ye." In response to the additional keystroke 464, the natural language system 236 combines (e.g., concatenates) the partial word "ye" in FIG. 4K and the additional keystroke 464 "ar" to form the word "year." The natural language system 236 generates and displays interpretations 466 corresponding to the word "year."

In some implementations, in response to receiving a keystroke that has a letter, the natural language system 236 may form a word by combining the letter with other letters, as illustrated in the example of FIG. 4L. The data visualization application 230 may also combine the letter with partial words in the natural language command to form a phrase. In some implementations, the natural language system 236 further interprets the phrase by performing a lexical translation from natural language into an intermediate expression (e.g., ArkLang), and comparing it against canonical forms of the intermediate expression. The natural language system 236 may infer terms that may be missing from the partial natural language command and assign default values to the missing terms. For example, in FIG. 4M, the natural language system 236 uses the phrase "sales from last year" and the interpretation 446 "sum of Sales" to infer a missing attribute "order date." The natural language system 236 then interprets the phrase "sales from last year" as a filter expression 244 with attribute="order date", filter="from" and value="last year". The graphical user interface 100 displays, in the filter interpretation region 404, a new filter 470 "with Order Date in the last year" in response to the interpretation. Further details of the intermediate language are described in U.S. patent application Ser. No. 16/166,125, filed Oct. 21, 2018, titled "Determining Levels of Detail for Data Visualizations Using Natural Language Constructs," which is hereby incorporated by reference in its entirety.

In some implementations, a user may retroactively annotate a term in the partial natural language input. FIG. 4M illustrates a user interaction (468) (e.g., hovering over, clicking on, or navigating the mouse to move a keystroke insertion point) with the term "last" in the partial natural language input. In response to the user interaction, the natural language system 236 updates the interpretations in the dropdown menu 408 to display the interpretations 460 corresponding to the term "last" (see FIG. 4K). A comparison between FIG. 4L and FIG. 4M shows that the position of the dropdown menu 408 has changed in accordance with this user interaction (468). In this example, the position of the dropdown menu 408 is located immediately below the term "last" (e.g., located below the substring of the input text which corresponds to the displayed search results).

FIG. 4N illustrates user selection (472) of the second interpretation 460-2 in the dropdown menu 408.

In some implementations, as illustrated in FIG. 4O, in response to the user selection of an interpretation, the graphical user interface 100 replaces a term in the partial natural input with the user-selected interpretation. Here, the term "last" in the partial natural language input "what are Easy-staple paper sales from last year" in FIG. 4N has been replaced by a term 474 "this," which corresponds to the value in the user-selected interpretation 460-2. The term 474 is another example of an annotated term.

FIG. 4O also illustrates in response to the user selection of an interpretation, the natural language system 236 replaces the filter 470 "with Order Date in the last year" with a new filter 476 "with Order Date this year". This change is consistent with the user-selected interpretation.

FIG. 4P illustrates user selection (478) of the graphical control element 401. As discussed earlier, user selection of the graphical control element causes the natural language command (e.g., "what are Easy-staple paper sales from this year") to be transmitted to the data visualization application 230 for interpretation. In this example, the term 432 and the term 474 have already been annotated. That is to say, the user has already instructed the data visualization application 230 to interpret the term 432 (e.g., "Easy-staple paper") as a particular entity in the data source 258 (e.g., as a value in the data field "Product Name"), and the user has already instructed the data visualization application 230 to interpret the term 474 (e.g., "this") as a particular entity in the data source 258 (e.g., with Order date corresponding to this year). The data visualization application 230 will use the assigned meanings for these terms and does not have to identify other meanings for these terms as it is synthesizing a viable response. In some implementations, in response to receiving a natural language command that includes annotated term (s), the data visualization application 230 applies the definitions that have been assigned for the annotated term(s) and interprets the terms in the natural language command that have not been annotated.

The implementations described in FIGS. 4A-4P also distinguish over the implementation that is described in FIG. 3. In the example of FIG. 3, a user has to input a complete word or phrase (e.g., the phrase 304 "year over year sales") before the graphical user interface 100 displays one or more interpretations 308. On the other hand, the examples of FIGS. 4A-4P illustrate that the interpretations are constantly updated in response to each keystroke entered by the user.

FIGS. 5A-5F provide a flowchart of a method 500. The method 500 is also called a process.

The method 500 is performed (502) at a computing device 200 that has a display 212, one or more processors 202, and memory 206. The memory 206 stores (504) one or more programs configured for execution by the one or more processors 202. In some implementations, the operations shown in FIGS. 4A to 4P correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 500 may be combined and/or the order of some operations may be changed.

The computing device 200 receives (506) from a user a partial natural language input related to a data source 258.

For example, in FIG. 4C, the computing device 200 receives from a user a partial natural language input "what are pape" related to a data source 258.

The computing device 200 receives (508) an additional keystroke corresponding to the partial natural language input. The partial natural language input and the additional keystroke comprise (510) a character string.

For example, referring to FIG. 4D, the computing device 200 receives an additional keystroke 422 (e.g., the letter "r") corresponding to the partial natural language input. The partial natural language input "what are pape" and the additional keystroke 422 "r" comprise a character string "what are paper."

In some implementations, a character string may be a string of letters that forms part of a word. For example, the letters "dis" are part of the word "distribution." A character string may be a word, such as "sales" or "price." In some implementations, a character string may include more than one word, separated by white space between words, such as "San Francisco." A character string may include complete words as well as letters of a word, such as the character string "what are pape" in FIG. 4C. In some implementations, the keystroke is appended to the end of the partial natural language input. For example, in FIG. 4D, the keystroke 422 (e.g., the letter "r") is appended to the end of the partial natural language input "what are pape." In some implementations, a user may click on any portion of the partial natural language and append the keystroke at the selected position.

In response (512) to the additional keystroke, the computing device 200 generates (514) (e.g., in real time) one or more interpretations corresponding to one or more entities in the data source 258.

For example, in FIG. 4D, in response to the additional keystroke 422, the computing device 200 generates one or more interpretations 424 corresponding to one or more entities (e.g., data values of data fields) in the data source 258.

In some instances, the character string includes (516) letters of a word. Each of the interpretations includes (516) the letters.

For example, in FIG. 4D, the character string "what are paper" includes the letters "p," "a," "p," "e," and 'r' of the word "paper." Each of the interpretations 424 includes these letters.

As another example, the character string may include the letters "dis." The interpretations may include the letters "dis," such as "distinct count of . . . " (e.g., an analytical operation), "disk drive" (e.g., a data value in a data field "Technology" in a data source), "as a histogram" (e.g., a synonym of "distribution").

In some instances, the character string includes (518) one or more terms. Each of the interpretations is an interpretation corresponding to the most recently input term in the character string.

For example, in FIG. 4I, the character string "what are Easy-staple paper sales from" include one or more terms (e.g., letters of a word, a word, a phrase etc.). Each of the interpretations 450 is an interpretation (e.g., search result or entity search result) corresponding to the most recently input term "from" in the character string.

In some instances, the one or more terms includes a letter (e.g., the letter "r"), letters of a word (e.g., the letters "gra" of the word "histogram"), a word (e.g., the word "sales"), two words separated by a space (e.g., "Santa Clara"), a number (e.g., "45"), an alphanumeric input (e.g., alpha123), a date (e.g., 1 Sep. 2020), or a numerical operator (e.g., an aggregation).

In some implementations, the interpretations 450 (e.g., search results or entity search results) correspond to the last term in the character input string. In some implementations, the interpretations 450 correspond to the last two terms, the last three terms, or last five terms, of the character input string. In some implementations, the interpretations 450 comprise the longest set of terms that has a non-empty result set. This is useful for cases where you are searching for an entity with a multi-word name, such as "daily price" or "satisfaction rating".

In some implementations, generating (520) one or more interpretations comprises generating one or more tokens from the character string. The computing device interprets (522) the one or more tokens according to a lexicon for the data source 258. This is discussed with respect to FIG. 4D.

In some instances, the one or more entities comprise (526) one or more of: a data field from the data source 258, a data value of a data field from the data source 258, an analytical operation on the data source, or a data visualization type.

For example, in FIG. 4G, the interpretations 438 comprise a data field 438-1 (the data field "Sales") of the data source 258. In FIG. 4D, the second interpretation 424-2 comprises a data value 418-2 ("Easy-staple paper") for a data field 420-2 (e.g., "Product Name") from the data source 258. In FIG. 4J, the first interpretation 456-1 is a sort operation (in an ascending order) on the data source 258.

In some instances, the analytical operation is (528) one of: a grouping, a sort, a filter, a calculation, a count, or an aggregation operation.

The computing device 200 displays (530) the interpretations. This is illustrated in FIGS. 4C, 4D, 4E, 4G, 4I, 4J, 4K, 4L, 4M, 4N, and 4O.

In some instances, the interpretations comprise interpretations of the combination of a portion of the partial natural language command and the additional keystroke. In some implementations, the interpretations are interpretations corresponding to only the additional keystroke.

In some implementations, the character string comprises (532) a sequence of terms. Displaying the interpretations comprises displaying the interpretations in a dropdown menu adjacent to the most recently entered term in the sequence of terms.

For example, in FIG. 4I, the character string "what are Easy-staple paper sales from" (e.g., the partial natural language input) comprises a sequence of terms (e.g., the words "what," "are," "Easy-staple," "paper," "sales," and "from"). Displaying the interpretations 450 comprises displaying the interpretations 450 in a dropdown menu 408 adjacent to (e.g., below or immediately below) the most recently entered term 448 "from" in the sequence of terms.

In some instances, the dropdown menu comprises (534) a plurality of rows. Each of the rows corresponds to a distinct data value of a data field from the data source. The method 500 further comprises displaying (536), in each of the rows, a respective data value and a respective data field corresponding to the respective data value. This is illustrated in FIGS. 4C and 4D.

In some implementations, the computer device 200 further displays (538), adjacent to a first interpretation of the interpretations, a statistical distribution of data values for a data field specified in the first interpretation. This is illustrated in FIG. 4H.

In some implementations, after generating (540) the one or more interpretations, the computing device 200 continues (542) to respond to each additional subsequent keystroke by updating the interpretations according to the additional subsequent keystroke. The computing device 200 also displays (544) the updated interpretations.

For example, in FIG. 4C, after generating the one or more interpretations 416, the computing device 200 continues to respond to each additional subsequent keystroke (e.g., the additional keystroke 422 in FIG. 4D) by updating the interpretations (e.g., from the interpretations 416 in FIG. 4C to the interpretations 424 in FIG. 4D) according to the additional subsequent keystroke 422.

In some implementations, the character string includes (546) one or more terms. The computing device 200 further receives (548) user selection of a first interpretation of the interpretations. In response to the user selection, the computing device 200 annotates (550) a first term in the character string.

For example, in FIG. 4E, the character string "what are paper" includes one or more terms. The computing device 200 receives user selection of the second interpretation 424-2 of the interpretations 424. In response to the user selection, the computing device 200 annotates the term "paper" in the character string, as illustrated by the annotated term 432 "Easy-staple paper" in FIG. 4F.

In some instances, the user selection is (549) received via a keyboard shortcut. In some implementations, the keyboard shortcut is a <Tab> key, a <Down> arrow key, an <Up> arrow key, or an <Enter> key of a keyboard.

In some instances, the first interpretation corresponds (552) to a first data value of a data field from the data source. Annotating the first term comprises establishing (554) an interpretation that filters rows of the data source to display only rows whose data value for the data field equals the first data value.

For example, in FIG. 4E, the second interpretation 418-2 corresponds to the data value "Easy-staple paper" for the data field "Product name" from the data source 258. Annotating the first term "paper" comprises establishing an interpretation that filters rows of the data source 258 to display only rows whose data value of the data field "Product name" equals the first data value "Easy-staple paper."

In some instances, the first interpretation corresponds (556) to an analytical operation on a data field in the data source. Annotating the first keyword comprises establishing (558) an interpretation that performs the analytical operation.

In some implementations, the character string consists (560) of a series of terms. After receiving the natural language input, the computing device 200 receives (562) user selection of a term in the series of terms. In response to the user selection of the term, the computing device 200 displays (564) one or more first interpretations corresponding to the selected term. The computing device 200 receives (566) user selection of one interpretation of the first interpretations. In response to the user selection of the one interpretation, the computing device 200 annotates (568) the selected term with the one interpretation.

For example, in FIG. 4M, after receiving the natural language input "what are Easy-staple paper sales from last year," the computing device 200 receives user selection of a term 468 (e.g., a word) "last" in the string of terms. In response to the user selection of the term 468 "last", the computing device 200 displays one or more first interpretations 460 corresponding to the selected term. The computing device 200 receives user selection of one interpretation 460-2 of the first interpretations 460, as illustrated in FIG. 4N. In response to the user selection of the one interpretation, the computing device 200 annotates the selected term "last" with the one interpretation 460-2 corresponding to the data value "this" of the date field, as illustrated in the annotated term 474 in FIG. 4O.

In some implementations, the character string includes (570) one or more terms. The computing device 200 receives (572) a user input consisting of a keyboard shortcut. In response to (574) the user input, the computing device 200 selects (576) a first interpretation of the interpretations. The computing device also annotates (578) a first term in the character string.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at a computing device having a display, one or more processors, and memory storing one or more programs configured for execution by the one or more processors:
   receiving from a user a partial natural language input related to a data source;
   receiving an additional keystroke corresponding to the partial natural language input, wherein the partial natural language input and the additional keystroke comprise a character string;
   in response to receiving the additional keystroke, generating one or more interpretations corresponding to one or more entities in the data source, each of the one or more interpretations corresponding to a respective entity of the data source;
   displaying the one or more interpretations;
   receiving user selection of an interpretation of the one or more interpretations; and
   in response to the user selection, annotating the character string, thereby interpreting the character string as a specific entity of the data source, corresponding to the character string.

2. The method of claim 1, wherein the character string includes letters of a word, and each of the one or more interpretations includes the letters.

3. The method of claim 1, wherein:
   the character string includes one or more terms; and
   each of the interpretations is an interpretation corresponding to a most recently input term in the character string.

4. The method of claim 1, wherein generating one or more interpretations comprises:
   generating one or more tokens from the character string; and
   interpreting the one or more tokens according to a lexicon for the data source.

5. The method of claim 1, further comprising:
   after generating the one or more interpretations:
      continuing to respond to each additional subsequent keystroke by updating the interpretations according to the additional subsequent keystroke; and
      displaying the updated interpretations.

6. The method of claim 1, wherein:
   the character string comprises a sequence of terms; and
   displaying the interpretations comprises displaying the interpretations in a dropdown menu adjacent to a most recently entered term in the sequence of terms.

7. The method of claim 6, wherein the dropdown menu comprises a plurality of rows, each row displaying a respective data value and a respective data field corresponding to the respective data value.

8. The method of claim 1, wherein displaying the interpretations further comprises:
   displaying, adjacent to a first interpretation of the interpretations, a statistical distribution of data values for a data field specified in the first interpretation.

9. The method of claim 1, wherein the one or more entities in the data source comprise one or more of:
   a data field of the data source;
   a data value of a data field in the data source;
   an analytical operation on the data source; and
   a data visualization type.

10. The method of claim 9, wherein the analytical operation is one of: a grouping, a sort, a filter, a calculation, a count, or an aggregation operation.

11. The method of claim 1, wherein:
    the interpretation selected by the user corresponds to a first data value of a data field in the data source; and
    annotating the character string includes establishing an interpretation that filters rows of the data source to display only rows whose data value of the data field equals the first data value.

12. The method of claim 1, wherein:
    the interpretation selected by the user corresponds to an analytical operation on a data field in the data source; and
    annotating the character string includes establishing an interpretation that performs the analytical operation.

13. The method of claim 1, wherein the user selection is received via a keyboard shortcut.

14. The method of claim 1, wherein the character string consists of a series of terms, the method further comprising:
    after receiving the natural language input, receiving user selection of a term in the series of terms;
    in response to the user selection of the term, displaying one or more first interpretations corresponding to the selected term;
    receiving user selection of one interpretation of the first interpretations; and
    in response to the user selection of the one interpretation, annotating the selected term with the one interpretation.

15. The method of claim 1, wherein the character string includes one or more terms, the method further comprising:
    receiving a user input consisting of a keyboard shortcut; and
    in response to the user input:
       selecting a first interpretation of the one or more interpretations; and
       annotating a first term in the character string.

16. A computing device, comprising:
    one or more processors; and
    memory coupled to the one or more processors, the memory storing one or more programs configured to be executed by the one or more processors, the one or more programs including instructions for:
       receiving from a user a partial natural language input related to a data source;
       receiving an additional keystroke corresponding to the partial natural language input, wherein the partial natural language input and the additional keystroke comprise a character string;
       in response to receiving the additional keystroke, generating one or more interpretations corresponding to one or more entities in the data source, each of the one or more interpretations corresponding to a respective entity of the data source;
       displaying the one or more interpretations;
       receiving user selection of an interpretation of the one or more interpretations; and
       in response to the user selection, annotating the character string, thereby interpreting the character string as a specific entity of the data source, corresponding to the character string.

17. The computing device of claim 16, wherein the instructions for generating one or more interpretations comprise instructions for:
    generating one or more tokens from the character string; and
    interpreting the one or more tokens according to a lexicon for the data source.

18. The computing device of claim 16, the one or more programs further comprising instructions for:
    after generating the one or more interpretations:
       continuing to respond to each additional subsequent keystroke by updating the interpretations according to the additional subsequent keystroke; and
       displaying the updated interpretations.

19. A non-transitory computer-readable storage medium storing one or more programs, the one or more programs comprising instructions, which when executed by a computing device, cause the computing device to perform operations comprising:
    receiving from a user a partial natural language input related to a data source;
    receiving an additional keystroke corresponding to the partial natural language input, wherein the partial natural language input and the additional keystroke comprise a character string;
    in response to the additional keystroke, generating one or more interpretations corresponding to one or more entities in the data source;
    displaying the one or more interpretations;
    receiving user selection of an interpretation of the one or more interpretations; and
    in response to the user selection, annotating the character string, thereby interpreting the character string as a specific entity of the data source, corresponding to the character string.

* * * * *